US010095683B2

(12) United States Patent
Hegerty et al.

(10) Patent No.: US 10,095,683 B2
(45) Date of Patent: Oct. 9, 2018

(54) CONTEXTUAL SPELLER MODELS ON ONLINE SOCIAL NETWORKS

(71) Applicant: Facebook, Inc., Menlo Park, CA (US)

(72) Inventors: Ian Douglas Hegerty, Andover (GB); Daniel Bernhardt, London (GB); Marcus Holland-Moritz, London (GB); Rafal Krzysztof Sadziak, London (GB)

(73) Assignee: Facebook, Inc., Menlo Park, CA (US)

(*) Notice: Subject to any disclaimer, the term of this patent is extended or adjusted under 35 U.S.C. 154(b) by 485 days.

(21) Appl. No.: 14/684,125

(22) Filed: Apr. 10, 2015

(65) Prior Publication Data

US 2016/0299882 A1    Oct. 13, 2016

(51) Int. Cl.
| | | |
|---|---|---|
| *G06F 17/00* | (2006.01) | |
| *G06F 17/20* | (2006.01) | |
| *G06F 17/27* | (2006.01) | |
| *G06Q 50/00* | (2012.01) | |
| *G06F 17/30* | (2006.01) | |
| *H04L 29/08* | (2006.01) | |

(52) U.S. Cl.
CPC ........ *G06F 17/273* (2013.01); *G06F 17/3064* (2013.01); *G06Q 50/01* (2013.01); *H04L 67/22* (2013.01)

(58) Field of Classification Search
CPC ............ G06F 17/30867; G06F 17/273; G06F 17/2735; G06F 17/274; G06F 17/3053; G06F 17/30554; G06F 17/30864; G06F 17/30654; G06F 17/3097; G06F 17/3064; G06F 17/2818; G06F 17/30675
See application file for complete search history.

(56) References Cited

U.S. PATENT DOCUMENTS

| | | | |
|---|---|---|---|
| 5,918,014 | A | 6/1999 | Robinson |
| 6,539,232 | B2 | 3/2003 | Hendrey |
| 6,957,184 | B2 | 10/2005 | Schmid |
| 7,069,308 | B2 | 6/2006 | Abrams |
| 7,379,811 | B2 | 5/2008 | Rasmussen |
| 7,539,697 | B1 | 5/2009 | Akella |

(Continued)

OTHER PUBLICATIONS

U.S. Appl. No. 11/503,093, filed Aug. 11, 2006, Bosworth.

(Continued)

*Primary Examiner* — Ariel Mercado Vargas
(74) *Attorney, Agent, or Firm* — Baker Botts L.L.P.

(57) ABSTRACT

In one embodiment, a method includes receiving a search query including one or more n-grams, determining for each n-gram if a contextual speller model indicates the n-gram is misspelled, identifying for each misspelled n-gram one or more variant-tokens based at least on the search query and a contextual speller model, generating one or more unique combinations of the n-grams and variant-tokens, where each unique combination includes a variant-token corresponding to each misspelled n-gram, calculating a relevance-score for each unique combination based at least in part on the search query and the contextual speller model, generating one or more corrected queries, where each corrected query includes a unique combination having a relevance-score greater than a threshold relevance-score, and sending one or more of the corrected queries to a user for display.

37 Claims, 12 Drawing Sheets

(56) References Cited

U.S. PATENT DOCUMENTS

| | | |
|---|---|---|
| 7,752,326 B2 | 7/2010 | Smit |
| 7,836,044 B2 | 11/2010 | Kamvar |
| 8,027,990 B1 | 9/2011 | Mysen |
| 8,060,639 B2 | 11/2011 | Smit |
| 8,112,529 B2 | 2/2012 | Van Den Oord |
| 8,180,804 B1 | 5/2012 | Narayanan |
| 8,185,558 B1 | 5/2012 | Narayanan |
| 8,239,364 B2 | 8/2012 | Wable |
| 8,244,848 B1 | 8/2012 | Narayanan |
| 8,271,471 B1 | 9/2012 | Kamvar |
| 8,271,546 B2 | 9/2012 | Gibbs |
| 8,301,639 B1 | 10/2012 | Myllymaki |
| 8,321,364 B1 | 11/2012 | Gharpure |
| 8,364,709 B1 | 1/2013 | Das |
| 8,386,465 B2 | 2/2013 | Ansari |
| 8,407,200 B2 | 3/2013 | Wable |
| 8,412,749 B2 | 4/2013 | Fortuna |
| 8,538,960 B2 | 9/2013 | Wong |
| 8,572,129 B1 | 10/2013 | Lee |
| 8,595,297 B2 | 11/2013 | Marcucci |
| 8,601,027 B2 | 12/2013 | Behforooz |
| 8,639,725 B1 | 1/2014 | Udeshi |
| 8,732,208 B2 | 5/2014 | Lee |
| 8,751,521 B2 | 6/2014 | Lee |
| 8,775,324 B2 | 7/2014 | Zhu |
| 8,782,080 B2 | 7/2014 | Lee |
| 8,782,753 B2 | 7/2014 | Lunt |
| 8,832,111 B2 | 9/2014 | Venkataramani |
| 8,868,590 B1 * | 10/2014 | Donneau-Golencer ............ G06F 17/3053 707/733 |
| 8,868,603 B2 | 10/2014 | Lee |
| 8,898,226 B2 | 11/2014 | Tiu |
| 8,909,637 B2 | 12/2014 | Patterson |
| 8,914,392 B2 | 12/2014 | Lunt |
| 8,918,418 B2 | 12/2014 | Lee |
| 8,924,406 B2 | 12/2014 | Lunt |
| 8,935,255 B2 | 1/2015 | Sankar |
| 8,935,261 B2 | 1/2015 | Pipegrass |
| 8,935,271 B2 | 1/2015 | Lassen |
| 8,949,250 B1 | 2/2015 | Garg |
| 8,949,261 B2 | 2/2015 | Lunt |
| 8,954,675 B2 | 2/2015 | Venkataramani |
| 8,983,991 B2 | 3/2015 | Sankar |
| 9,317,606 B1 * | 4/2016 | Nayak ............ G06F 17/30864 |
| 2002/0086676 A1 | 7/2002 | Hendrey |
| 2002/0196273 A1 | 12/2002 | Krause |
| 2003/0154194 A1 | 8/2003 | Jonas |
| 2003/0208474 A1 | 11/2003 | Soulanille |
| 2004/0088325 A1 | 5/2004 | Elder |
| 2004/0172237 A1 | 9/2004 | Saldanha |
| 2004/0215793 A1 | 10/2004 | Ryan |
| 2004/0255237 A1 | 12/2004 | Tong |
| 2005/0091202 A1 | 4/2005 | Thomas |
| 2005/0125408 A1 | 6/2005 | Somaroo |
| 2005/0131872 A1 | 6/2005 | Calbucci |
| 2005/0171955 A1 | 8/2005 | Hull |
| 2005/0256756 A1 | 11/2005 | Lam |
| 2006/0136419 A1 | 6/2006 | Brydon |
| 2006/0190436 A1 | 8/2006 | Richardson |
| 2007/0277100 A1 | 11/2007 | Sheha |
| 2008/0033926 A1 | 2/2008 | Matthews |
| 2008/0072180 A1 | 3/2008 | Chevalier |
| 2008/0183694 A1 | 7/2008 | Cane |
| 2008/0183695 A1 | 7/2008 | Jadhav |
| 2008/0270615 A1 | 10/2008 | Centola |
| 2009/0006543 A1 | 1/2009 | Smit |
| 2009/0094200 A1 | 4/2009 | Baeza-Yates |
| 2009/0164929 A1 | 6/2009 | Chen |
| 2009/0197681 A1 | 8/2009 | Krishnamoorthy |
| 2009/0228296 A1 | 9/2009 | Ismalon |
| 2009/0265326 A1 | 10/2009 | Lehrman |
| 2009/0281988 A1 | 11/2009 | Yoo |
| 2009/0299963 A1 | 12/2009 | Pippori |
| 2010/0049802 A1 | 2/2010 | Raman |
| 2010/0057723 A1 | 3/2010 | Rajaram |
| 2010/0125562 A1 | 5/2010 | Nair |
| 2010/0179929 A1 | 7/2010 | Yin |
| 2010/0197318 A1 | 8/2010 | Petersen |
| 2010/0228744 A1 | 9/2010 | Craswell |
| 2010/0235354 A1 | 9/2010 | Gargaro |
| 2010/0321399 A1 | 12/2010 | Ellren |
| 2011/0022602 A1 | 1/2011 | Luo |
| 2011/0078166 A1 | 3/2011 | Oliver |
| 2011/0087534 A1 | 4/2011 | Strebinger |
| 2011/0137902 A1 | 6/2011 | Wable |
| 2011/0191371 A1 | 8/2011 | Elliott |
| 2011/0196855 A1 | 8/2011 | Wable |
| 2011/0231296 A1 | 9/2011 | Gross |
| 2011/0276396 A1 | 11/2011 | Rathod |
| 2011/0313992 A1 | 12/2011 | Groeneveld |
| 2011/0320470 A1 | 12/2011 | Williams |
| 2012/0059708 A1 | 3/2012 | Galas |
| 2012/0136852 A1 | 5/2012 | Geller |
| 2012/0166432 A1 | 6/2012 | Tseng |
| 2012/0166433 A1 | 6/2012 | Tseng |
| 2012/0179637 A1 | 7/2012 | Juan |
| 2012/0185486 A1 | 7/2012 | Voigt |
| 2012/0209832 A1 | 8/2012 | Neystadt |
| 2012/0221581 A1 | 8/2012 | Narayanan |
| 2012/0271831 A1 | 10/2012 | Narayanan |
| 2012/0278127 A1 | 11/2012 | Kirakosyan |
| 2012/0284329 A1 | 11/2012 | Van Den Oord |
| 2012/0311034 A1 | 12/2012 | Goldband |
| 2012/0317088 A1 | 12/2012 | Pantel |
| 2012/0331063 A1 | 12/2012 | Rajaram |
| 2013/0031106 A1 | 1/2013 | Schechter |
| 2013/0041876 A1 | 2/2013 | Dow |
| 2013/0066876 A1 | 3/2013 | Raskino |
| 2013/0086057 A1 | 4/2013 | Harrington |
| 2013/0124492 A1 * | 5/2013 | Gao ............ G06F 17/2818 707/706 |
| 2013/0124538 A1 | 5/2013 | Lee |
| 2013/0124542 A1 | 5/2013 | Lee |
| 2013/0144899 A1 | 6/2013 | Lee |
| 2013/0191372 A1 | 7/2013 | Lee |
| 2013/0191416 A1 | 7/2013 | Lee |
| 2013/0198219 A1 | 8/2013 | Cohen |
| 2013/0226918 A1 | 8/2013 | Berkhim |
| 2013/0246404 A1 | 9/2013 | Annau |
| 2014/0032532 A1 * | 1/2014 | Song ............ G06F 17/30011 707/722 |
| 2016/0171108 A1 * | 6/2016 | Chen ............ G06F 17/3064 707/767 |

OTHER PUBLICATIONS

U.S. Appl. No. 12/763,162, filed Apr. 19, 2010, Lee.
U.S. Appl. No. 12/977,027, filed Dec. 22, 2010, Tseng.
U.S. Appl. No. 12/978,265, filed Dec. 23, 2010, Juan.
U.S. Appl. No. 13/556,072, filed Jul. 23, 2012, Lee.
U.S. Appl. No. 13/632,869, filed Oct. 1, 2012, Matus.
U.S. Appl. No. 13/674,695, filed Nov. 12, 2012, Lee.
U.S. Appl. No. 13/731,866, filed Dec. 31, 2012, Vee.
U.S. Appl. No. 13/732,101, filed Dec. 31, 2012, Lee.
U.S. Appl. No. 14/244,748, filed Apr. 3, 2014, Kumar.
U.S. Appl. No. 14/470,607, filed Aug. 27, 2014, Boucher.
U.S. Appl. No. 14/556,368, filed Dec. 2, 2014, Hegerty.
U.S. Appl. No. 14/561,418, filed Dec. 5, 2014, Zhou.
U.S. Appl. No. 14/684,137, filed Apr. 10, 2015, Zhu.

* cited by examiner

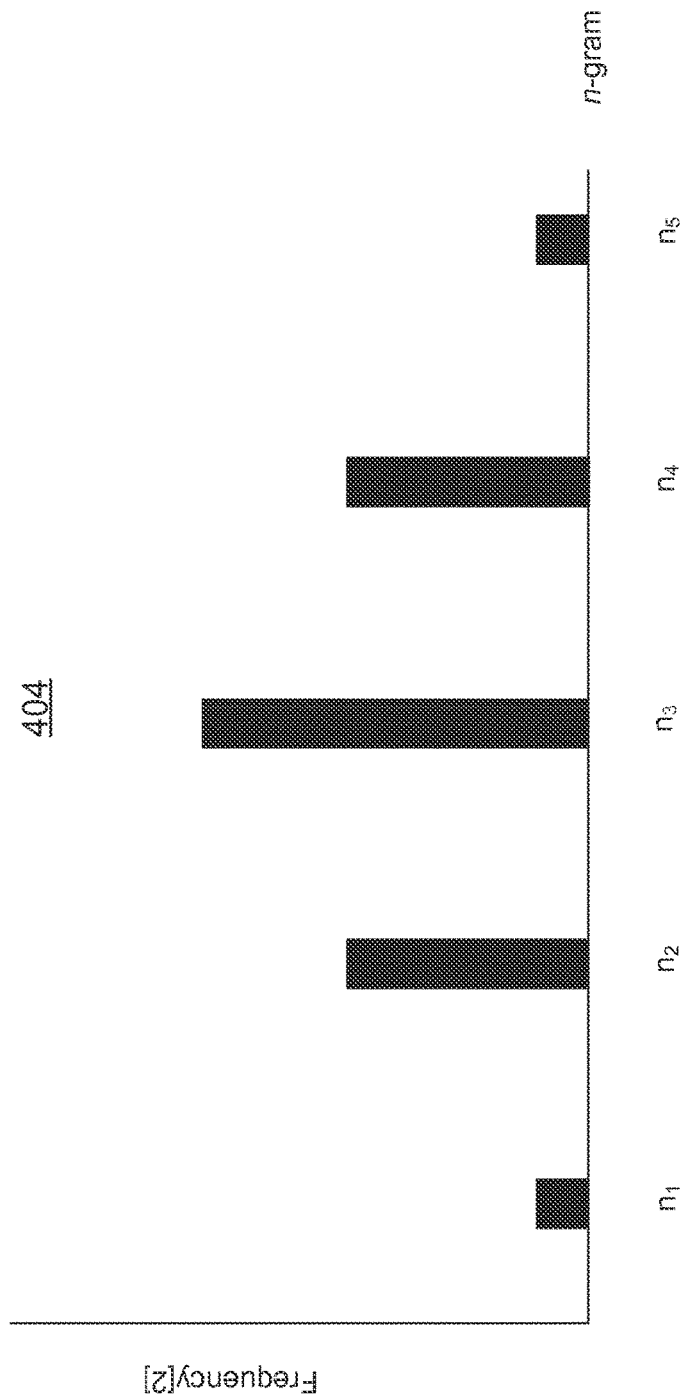

CONTEXTUAL SPELLER MODELS ON ONLINE SOCIAL NETWORKS

TECHNICAL FIELD

This disclosure generally relates to detecting and correcting misspelled search queries.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual users within the networks, and edges represent the relationships between the users. The resulting graph-based structures are often very complex. In its simplest form, a social graph is a map of all of the relevant edges between all the nodes being studied.

SUMMARY OF PARTICULAR EMBODIMENTS

In particular embodiments, the social-networking system may detect and correct misspelled n-grams in a search query using language models customized to the querying user. The search query may be associated with any object type such as, for example, groups, events, pages, posts, photos, videos, comments, reshares, users or other suitable objects of the social-networking system. In particular embodiments, such detection and correction of misspelled n-grams may be useful in a typeahead context. In particular embodiments, the detection and correction of misspelled n-grams may be applicable to any query user case such as, for example, graph search, keyword search, or tagging.

In particular embodiments, customization of the language models may be based on social-networking data associated with the social-networking system and with the querying user. Customization of the language models may depend on a contextual speller model taking into consideration a time context and a social context of the social-networking data and the querying user. As an example and not by way of limitation, the contextual speller model may be based on a standard language model that is further appended with social-networking data that has a time and/or social relevance with the querying user. The social-networking data may encompass a customized dictionary of n-grams that are relevant to the user and may be utilized by a search engine of the social-networking system to detect and correct misspelled n-grams. Accordingly, utilizing the contextual speller model to detect and correct misspelled n-grams in search queries may assist the search engine to implement a spell-correction functionality that is relevant to particular users of the search engine.

In particular embodiments, the search engine may utilize the contextual speller model to determine a probability of an n-gram corresponding to a correctly-spelled variant token of the misspelled n-gram. The determination may be based on one or more mathematical probability distributions. Each retrieved n-gram may be associated with at least one mathematical probability distribution. In particular embodiments, each mathematical probability distribution may be distinguished by a time context and/or a social context of the contextual speller model.

In particular embodiments, the social-networking system may determine an optimal candidate variant token to correct a misspelled n-gram by considering candidate variant tokens corresponding to one or more n-grams preceding the misspelled n-gram. In particular embodiments, the social-networking system may score the individual selected candidate variant tokens for each misspelled n-gram.

In particular embodiments, the social-networking system may utilize a hidden Markov model (HMM) to consider one or more features of the preceding candidate variant tokens in order to determine an optimal sequence of candidate variant tokens for correcting a misspelled search query. The social-networking system may generate a bi-gram feature value (e.g., a transitional logarithmic probability) for every pair of candidate variant tokens corresponding to neighboring bi-grams. The bi-gram feature value may include features of both candidate variant tokens. In particular embodiments, the social-networking system may determine a feature vector for a sequence of candidate variant tokens to correct the misspelled search query based at least on the individual bi-gram feature values of each pair of candidate variant tokens corresponding to neighboring bi-grams of the misspelled search query.

In particular embodiments, the social-networking system may utilize a Viterbi dynamic programming algorithm to determine the optimal sequence of candidate variant tokens corresponding for correcting the misspelled search query efficiently. For example, for each candidate variant token, the social-networking system may utilize the Viterbi dynamic programming algorithm to iteratively determine an optimal bi-gram candidate variant token given all its associated preceding candidate variant tokens. Thereafter, when considering the next succeeding candidate variant token, the social-networking system may only need to consider the optimal bi-gram candidate variant tokens as previously determined. Accordingly, the Viterbi dynamic programming algorithm may enable the social-networking system to reduce resources (e.g., computing hardware, and/or time) for determining the optimal sequence of candidate variant tokens for correcting the misspelled search query.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIGS. 4A-4D illustrate the social-networking system determining example changes in probabilities of example n-grams.

DESCRIPTION OF EXAMPLE EMBODIMENTS

System Overview

Figure 1:
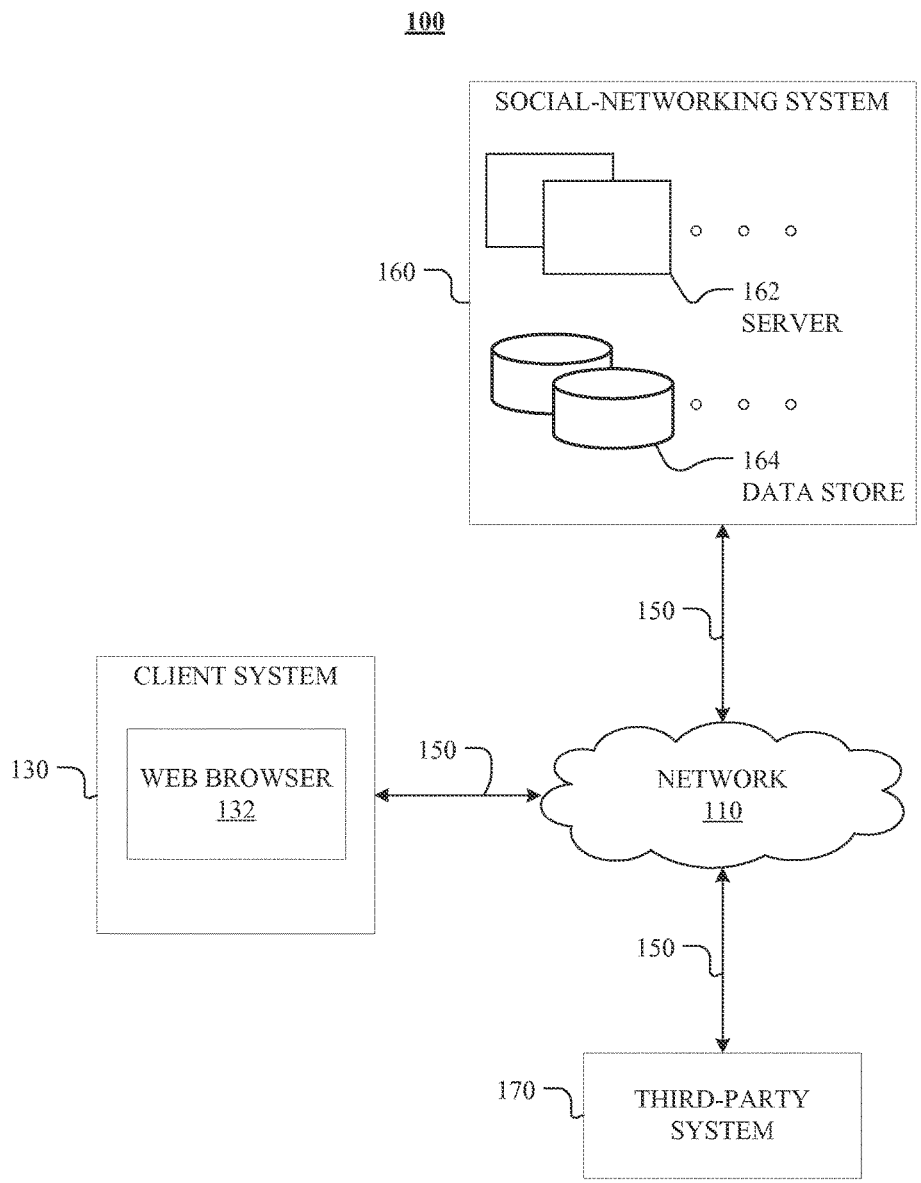
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, c-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes-which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
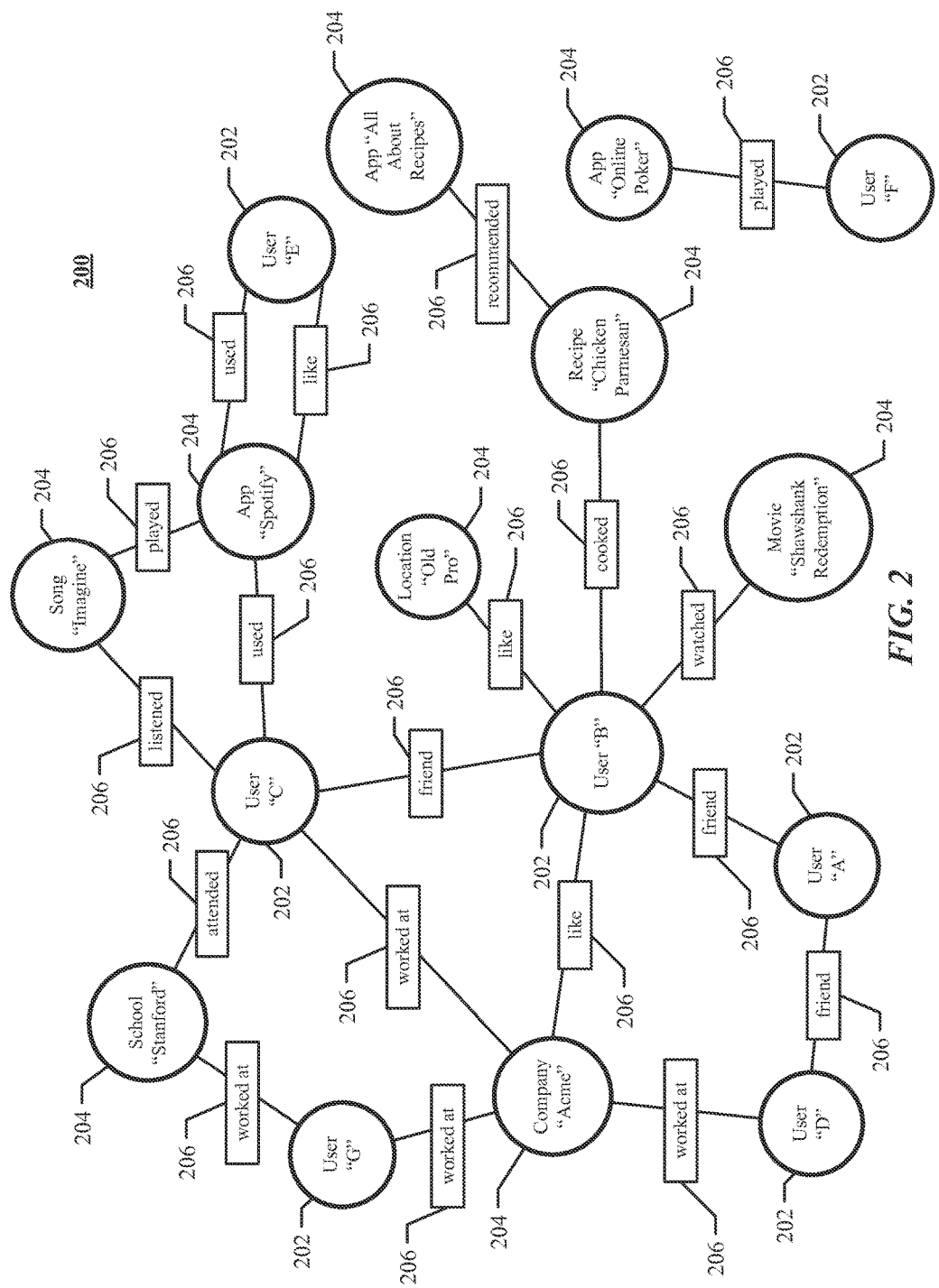
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server, real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more data stores 164. In the example of FIG. 2, social graph 200 includes an edge 206 indicating a friend relation between user nodes 202 of user "A" and user "B" and an edge indicating a friend relation between user nodes 202 of user "C" and user "B."

Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Search Queries on Online Social Networks

In particular embodiments, a user may submit a query to the social-networking system 160 by, for example, selecting a query input or inputting text into query field. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into a query field to search for content on the social-networking system 160 that matches the text query. The social-networking system 160 may then search a data store 164 (or, in particular, a social-graph database) to identify content matching the query. The search engine may conduct a search based on the query phrase using various search algorithms and generate search results that identify resources or content (e.g., user-profile pages, content-profile pages, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 202, concept nodes 204, edges 206), profile pages, external webpages, or any combination thereof. The social-networking system 160 may then generate a search-results page with search results corresponding to the identified content and send the search-results page to the user. The search results may be presented to the user, often in the form of a list of links on the search-results page, each link being associated with a different page that contains some of the identified resources or content. In particular embodiments, each link in the search results may be in the form of a Uniform Resource Locator (URL) that specifies where the corresponding page is located and the mechanism for retrieving it. The social-networking system 160 may then send the search-results page to the web browser 132 on the user's client system 130. The user may then click on the URL links or otherwise select the content from the search-results page to access the content from the social-networking system 160 or from an external system (such as, for example, a third-party system 170), as appropriate. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 170, the internet or World Wide Web, or other suitable sources. Although this disclosure describes querying the social-networking system 160 in a particular manner, this disclosure contemplates querying the social-networking system 160 in any suitable manner.

Typeahead Processes and Queries

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested page (such as, for example, a user-profile page, a concept-profile page, a search-results page, a user interface of a native application associated with the online social network, or another suitable page of the online social network), which may be hosted by or accessible in the social-networking system 160. In particular embodiments, as a user is entering text to make a declaration, the typeahead feature may attempt to match the string of textual characters being entered in the declaration to strings of characters (e.g., names, descriptions) corresponding to users, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element. In particular embodiments, as the user enters characters into a form box, the typeahead process may read the string of entered textual characters. As each keystroke is made, the frontend-typeahead process may send the entered character string as a request (or call) to the backend-typeahead process executing within social-networking system 160. In particular embodiments, the typeahead process may use one or more matching algorithms to attempt to identify matching social-graph elements. In particular embodiments, when a match or matches are found, the typeahead process may send a response to the user's client system 130 that may include, for example, the names (name strings) or descriptions of the matching social-graph elements as well as, potentially, other metadata associated with the matching social-graph elements. As an example and not by way of limitation, if a user enters the characters "pok"

into a query field, the typeahead process may display a drop-down menu that displays names of matching existing profile pages and respective user nodes 202 or concept nodes 204, such as a profile page named or devoted to "poker" or "pokemon," which the user can then click on or otherwise select thereby confirming the desire to declare the matched user or concept name corresponding to the selected node.

More information on typeahead processes may be found in U.S. patent application Ser. No. 12/763,162, filed 19 Apr. 2010, and U.S. patent application Ser. No. 13/556,072, filed 23 Jul. 2012, which are incorporated by reference.

In particular embodiments, the typeahead processes described herein may be applied to search queries entered by a user. As an example and not by way of limitation, as a user enters text characters into a query field, a typeahead process may attempt to identify one or more user nodes 202, concept nodes 204, or edges 206 that match the string of characters entered into the query field as the user is entering the characters. As the typeahead process receives requests or calls including a string or n-gram from the text query, the typeahead process may perform or cause to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may send a response to the user's client system 130 that may include, for example, the names (name strings) of the matching nodes as well as, potentially, other metadata associated with the matching nodes. The typeahead process may then display a drop-down menu that displays names of matching existing profile pages and respective user nodes 202 or concept nodes 204, and displays names of matching edges 206 that may connect to the matching user nodes 202 or concept nodes 204, which the user can then click on or otherwise select thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu. The user may then confirm the auto-populated declaration simply by keying "enter" on a keyboard or by clicking on the auto-populated declaration. Upon user confirmation of the matching nodes and edges, the typeahead process may send a request that informs the social-networking system 160 of the user's confirmation of a query containing the matching social-graph elements. In response to the request sent, the social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, and U.S. patent application Ser. No. 12/978,265, filed 23 Dec. 2010, which are incorporated by reference.

Structured Search Queries

In particular embodiments, in response to a text query received from a first user (i.e., the querying user), the social-networking system 160 may parse the text query and identify portions of the text query that correspond to particular social-graph elements. However, in some cases a query may include one or more terms that are ambiguous, where an ambiguous term is a term that may possibly correspond to multiple social-graph elements. To parse the ambiguous term, the social-networking system 160 may access a social graph 200 and then parse the text query to identify the social-graph elements that corresponded to ambiguous n-grams from the text query. The social-networking system 160 may then generate a set of structured queries, where each structured query corresponds to one of the possible matching social-graph elements. These structured queries may be based on strings generated by a grammar model, such that they are rendered in a natural-language syntax with references to the relevant social-graph elements. As an example and not by way of limitation, in response to the text query, "show me friends of my girlfriend." the social-networking system 160 may generate a structured query "Friends of Stephanie," where "Friends" and "Stephanie" in the structured query are references corresponding to particular social-graph elements. The reference to "Stephanie" would correspond to a particular user node 202 (where the social-networking system 160 has parsed the n-gram "my girlfriend" to correspond with a user node 202 for the user "Stephanie"), while the reference to "Friends" would correspond to friend-type edges 206 connecting that user node 202 to other user nodes 202 (i.e., edges 206 connecting to "Stephanie's" first-degree friends). When executing this structured query, the social-networking system 160 may identify one or more user nodes 202 connected by friend-type edges 206 to the user node 202 corresponding to "Stephanie". As another example and not by way of limitation, in response to the text query, "friends who work at facebook," the social-networking system 160 may generate a structured query "My friends who work at Facebook," where "my friends," "work at," and "Facebook" in the structured query are references corresponding to particular social-graph elements as described previously (i.e., a friend-type edge 206, a work-at-type edge 206, and concept node 204 corresponding to the company "Facebook"). By providing suggested structured queries in response to a user's text query, the social-networking system 160 may provide a powerful way for users of the online social network to search for elements represented in the social graph 200 based on their social-graph attributes and their relation to various social-graph elements. Structured queries may allow a querying user to search for content that is connected to particular users or concepts in the social graph 200 by particular edge-types. The structured queries may be sent to the first user and displayed in a drop-down menu (via, for example, a client-side typeahead process), where the first user can then select an appropriate query to search for the desired content. Some of the advantages of using the structured queries described herein include finding users of the online social network based upon limited information, bringing together virtual indexes of content from the online social network based on the relation of that content to various social-graph elements, or finding content related to you and/or your friends. Although this disclosure describes generating particular structured queries in a particular manner, this disclosure contemplates generating any suitable structured queries in any suitable manner.

More information on element detection and parsing queries may be found in U.S. patent application Ser. No. 13/556,072, filed 23 Jul. 2012, U.S. patent application Ser. No. 13/731,866, filed 31 Dec. 2012, and U.S. patent application Ser. No. 13/732,101, filed 31 Dec. 2012, each of which is incorporated by reference. More information on structured search queries and grammar models may be found in U.S. patent application Ser. No. 13/556,072, filed 23 Jul. 2012, U.S. patent application Ser. No. 13/674,695, filed 12 Nov. 2012, and U.S. patent application Ser. No. 13/731,866, filed 31 Dec. 2012, each of which is incorporated by reference.

Generating Keywords and Keyword Queries

In particular embodiments, social-networking system 160 may provide customized keyword completion suggestions to a querying user as the user is inputting a text string into a query field. Keyword completion suggestions may be provided to the user in a non-structured format. In order to generate a keyword completion suggestion, the social-networking system 160 may access multiple sources within the social-networking system 160 to generate keyword completion suggestions, score the keyword completion suggestions from the multiple sources, and then return the keyword completion suggestions to the user. As an example and not by way of limitation, if a user types the query "friends stan," then the social-networking system 160 may suggest, for example, "friends stanford," "friends stanford university," "friends stanley," "friends stanley cooper," "friends stanley kubrick," "friends stanley cup," and "friends stanlonski." In this example, the social-networking system 160 is suggesting the keywords which are modifications of the ambiguous n-gram "stan," where the suggestions may be generated from a variety of keyword generators. The social-networking system 160 may have selected the keyword completion suggestions because the user is connected in some way to the suggestions. As an example and not by way of limitation, the querying user may be connected within social graph 200 to the concept node 204 corresponding to Stanford University, for example by like- or attended-type edges 206. The querying user may also have a friend named Stanley Cooper. Although this disclosure describes generating keyword completion suggestions in a particular manner, this disclosure contemplates generating keyword completion suggestions in any suitable manner.

More information on keyword queries may be found in U.S. patent application Ser. No. 14/244,748, filed 3 Apr. 2014, U.S. patent application Ser. No. 14/470,607, filed 27 Aug. 2014, and U.S. patent application Ser. No. 14/561,418, filed 5 Dec. 2014, each of which is incorporated by reference.

Contextual Speller Models

In particular embodiments, social-networking system 160 may utilize one or more contextual language models customized to a user, such as a user of social-networking system 160, to detect and correct misspelled n-grams in a misspelled search query of the user. Herein, reference to a misspelled search query may encompass a search query having one or more misspelled n-grams. The contextual speller model may be based at least on a standard language model, where the standard language model may include a plurality of n-grams corresponding to social-networking data of all users and/or concepts within a particular group or country, or all users and/or concepts using a particular language within the online social network. Furthermore, social-networking system 160 may append social-networking data associated with the user to the standard language model to generate the contextual speller model. In particular embodiments, customization of the contextual speller model to the user may be based on associating the appended social-networking data with at least the user. As an example and not by way of limitation, the social-networking data may be associated with one or more concepts, such as any suitable group, any suitable demographic, and/or any suitable interest, associated with at least the user. In particular embodiments, the social-networking data associated with the user may include a personal language model associated with the user. As an example and not by way of limitation, the personal language model may include a plurality of n-grams, such as acronyms and/or texts, extracted from any suitable feed searches of the user on social-networking system 160, any suitable posts viewed by the user on social-networking system 160, any suitable posts viewed by other user of social-networking system 160 where the other user may be associated with the querying user, any suitable likes (e.g., of pages and/or user) of the user on social-networking system 160, any suitable previous search results of the user on social-networking system 160, any suitable profile information of the user on social-networking system 160, any suitable events that the user has attended, any suitable social-networking data being displayed on a computer screen for a pre-determined duration of time, or any suitable combinations thereof. In other words, the personal language model may include a customized dictionary of n-grams that are relevant to the querying user. Although this disclosure describes using a contextual speller model to correct misspelled n-grams in search queries, this disclosure contemplates using a contextual speller model to correct misspelled n-grams in any suitable context. As an example and not by way of limitation, a contextual speller model may be used to correct misspelled n-grams in any suitable user input, such as form entry fields, messaging applications, post/comment entry fields, or other suitable user inputs. As such, the contextual speller model may include a plurality of n-grams, such as acronyms and/or texts, extracted from one or more of the suitable user inputs as described.

In particular embodiments, the social-networking data associated with the user may include a personal language model associated with a group of users of social-networking system 160 (e.g., users within a particular company, school, geographic area, social circle, etc.), where the group of users include the querying user. As such, the personal language model may include a plurality of n-grams, such as acronyms and/or texts, extracted from any suitable feed searches of the group of users on social-networking system 160, any suitable posts viewed by the group of users on social-networking system 160, any suitable likes (e.g., of pages and/or user) of the group of users on social-networking system 160, any suitable previous search results of the group of users on social-networking system 160, one or more suitable profiles of the group of users on social-networking system 160, any suitable events that one or more users of the group have attended, any suitable social-networking data being displayed on a computer screen for a pre-determined duration of time, or any suitable combinations thereof. In other words, the personal language model may include a customized dictionary of n-grams that are relevant to the group of users. Although this disclosure describes generating particular language models in a particular manner, this disclosure contemplates generating any suitable language models in any suitable manner.

In particular embodiments, it may be desirable for a search engine, such as a search engine of social-networking system 160, to utilize the contextual speller model to detect and correct misspelled search queries. Furthermore, the contextual speller model may be customized to a user of the search engine, as discussed above. In particular embodiments, a search engine may detect and correct misspelled n-grams based on a standard language model, where the standard language model may include a plurality of n-grams corresponding to social-networking data of all users and/or concepts associated with the online social network generally, associated with users/concepts within a particular group or country, or associated with users concepts using a particular language within the online social network. In contrast, a contextual speller model customized to the user of the search engine may enable the search engine to detect and correct misspelled n-grams in one or more contexts, such as any suitable organization, any suitable demographic, and/or any suitable geographic region, relevant to the user of the search engine. As such, particular n-grams that would be considered misspelled by the standard language model may be considered to be correctly spelled by the search engine utilizing the contextual speller model. Furthermore, the contextual speller model may enable the search engine to avoid correcting rare n-grams that are potentially relevant to the user of the search engine. As an example and not by way of limitation, a search engine utilizing the standard language model may detect and correct a rare username, such as "Ian Hegerty", of a search query to a more commonly-used username spelling, such as "Ian Hegarty", without further considerations. In contrast, the search engine utilizing the contextual speller model may avoid the mistake of correcting the rare username, especially when the user of the search engine is "Ian Hegerty."

In particular embodiments, social-networking system 160 may generate a contextual speller model based at least in part on a time context of social-networking data associated with the querying user. In particular embodiments, the contextual speller model may be continuously appended with social-networking data within a particular range of time, enabling the contextual speller model to be relevant to the user of the search engine. The appended social-networking data may be bounded by a pre-determined range of time, such as data from the past 7 days or past 30 days, data from within a specified period of time from a certain event. The social-networking data may include n-grams extracted from posts, comments, reshares, other suitable content of the online social network, or any combination thereof associated with the querying user. As an example and not by way of limitation, referencing a contextual speller model associated with movies, social-networking system 160 may retrieve n-grams associated with movies scheduled to be shown in national theatres over the weekend and associated with the user via concepts connected to the user on social-networking system 160 (for example, movies viewed/liked/etc. by friends of the querying user). Thereafter, social-networking system 160 may append the retrieved n-grams to the contextual speller model. As another example and not way of limitation, referencing a contextual speller model associated with restaurants, social-networking system 160 may retrieve n-grams associated with restaurants that are currently opened and close to a geographic location associated with the user (for example, a city where the user resides). In particular embodiments, the contextual speller mode may be time-variant. In other words, the contextual speller model may change over time, or be updated over time by social-networking system 160. As an example and not by way of limitation, based on a contextual speller model at a first time instance, a search engine may initially score "Michael" higher than "Mikael" as a candidate variant token to correct misspelled username n-gram "Michal". By a later time instance, social-networking system 160 may append additional social-networking data, such as recent feeds and/or posts that the user of the search engine has recently interacted with on social-networking system 160, to the contextual speller model. Furthermore, the appended social-networking data may include additional occurrences of "Mikael." Based at least on the updated contextual speller model at the later time instance, the search engine may score of "Mikael" higher than "Michael." In particular embodiments, a contextual speller model may include social-networking data retrieved from social-networking system 160 at repeated time intervals. As an example and not by way of limitation, the social-networking data may include n-grams of weekly group reports retrieved from social-networking system 160 every Friday. As another example and not by way of limitation, the social-networking data may include n-grams of restaurants retrieved from social-networking system 160 every Friday and Saturday. In particular embodiments, the contextual speller model may be time invariant. In other words, the generated contextual speller model may not change substantially over time. As an example and not by way of limitation, the contextual speller model may be generated based on social-networking data from a first period of time and not subsequently updated over time. Although this disclosure describes generating particular contextual speller models based on particular social-networking data, this disclosure contemplates generating any suitable contextual speller models based on any suitable social-networking data.

In particular embodiments, social-networking system 160 may generate a contextual spell model based at least in part on a social context of social-networking data associated with the querying user. In particular embodiments, the social-networking data of the generated contextual speller model may include keyword n-grams associated with the user and further associated with a concept, such as any suitable demographic, any suitable interest, or any suitable organization (e.g., company), connected to the user from social-networking system 160. Furthermore, the concept may be connected to other users or to a pre-determined cluster of users of social-networking system 160. As such, the search engine may utilize the generated contextual speller model for the pre-determined cluster of users connected by the common concept. The social-networking data may include n-grams extracted from posts, comments, reshares, other suitable content of the online social network, or any combination thereof associated with the querying user or the cluster of users connected to a common concept. The keyword n-grams may be commonly used within the cluster of users. In particular embodiments, the generated contextual speller model may distinguish the user of the search engine. As an example and not by way of limitation, referencing the user as an employee of the company Acme, a contextual speller model may be generated based on social-networking data associated with the user and further associated with n-grams associated with the company Acme. The social-networking data may include abbreviations, technical terms, jargon, brand names, other suitable terms associated with the company Acme (for example, terms used by other employees of the company on the online social network), or any combination thereof. In particular embodiments, the generated contextual speller model may be time-invariant. In other words, the generated contextual speller model may not change substantially over time. In particular embodiments, the generated contextual speller model may be time-variant. As an example and not by way of limitation, the generated contextual speller model may be continuously appended with social-networking data within a particular range of time as discussed above. Although this disclosure describes generating particular contextual speller models based on particular social-networking data, this disclosure contemplates generating any suitable contextual speller models based on any suitable social-networking data.

Figure 3:
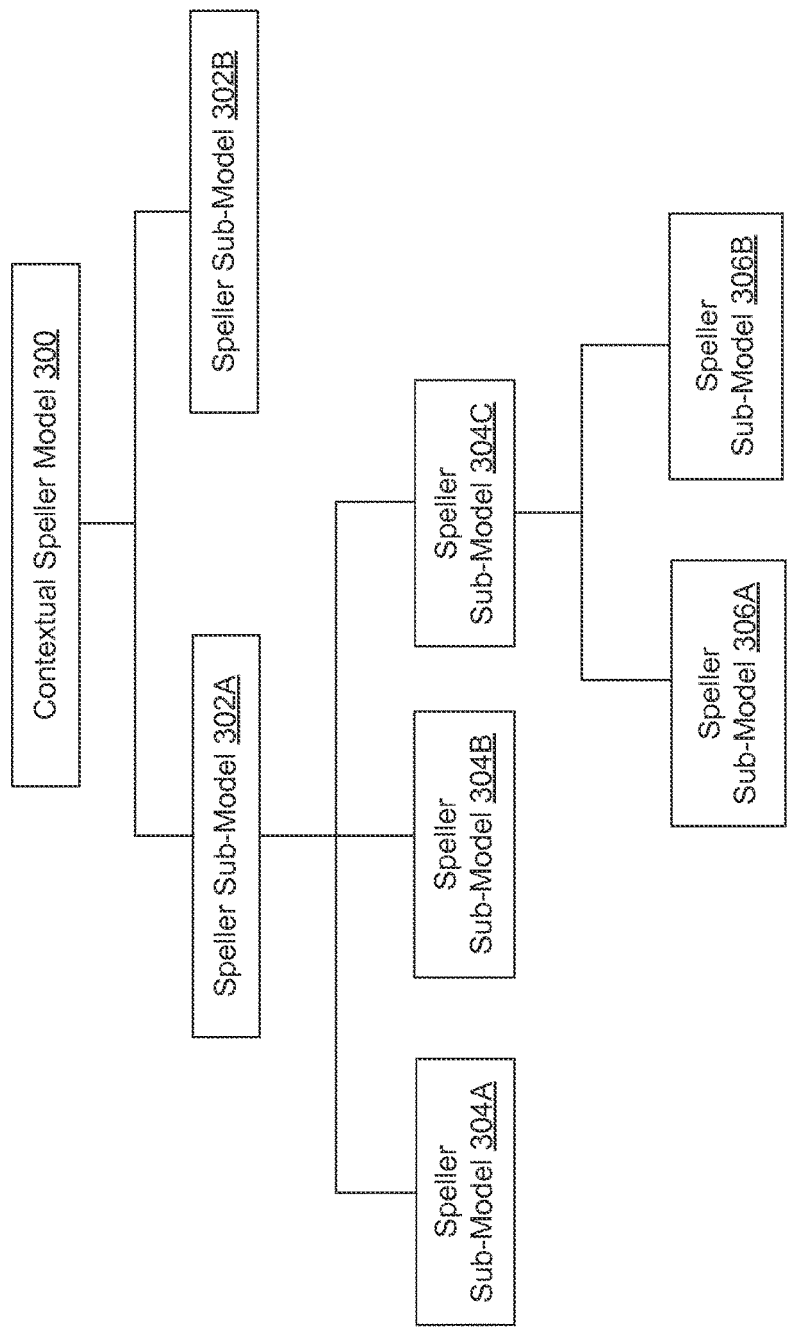
FIG. 3 illustrates an example contextual speller model.
Figure 4A:
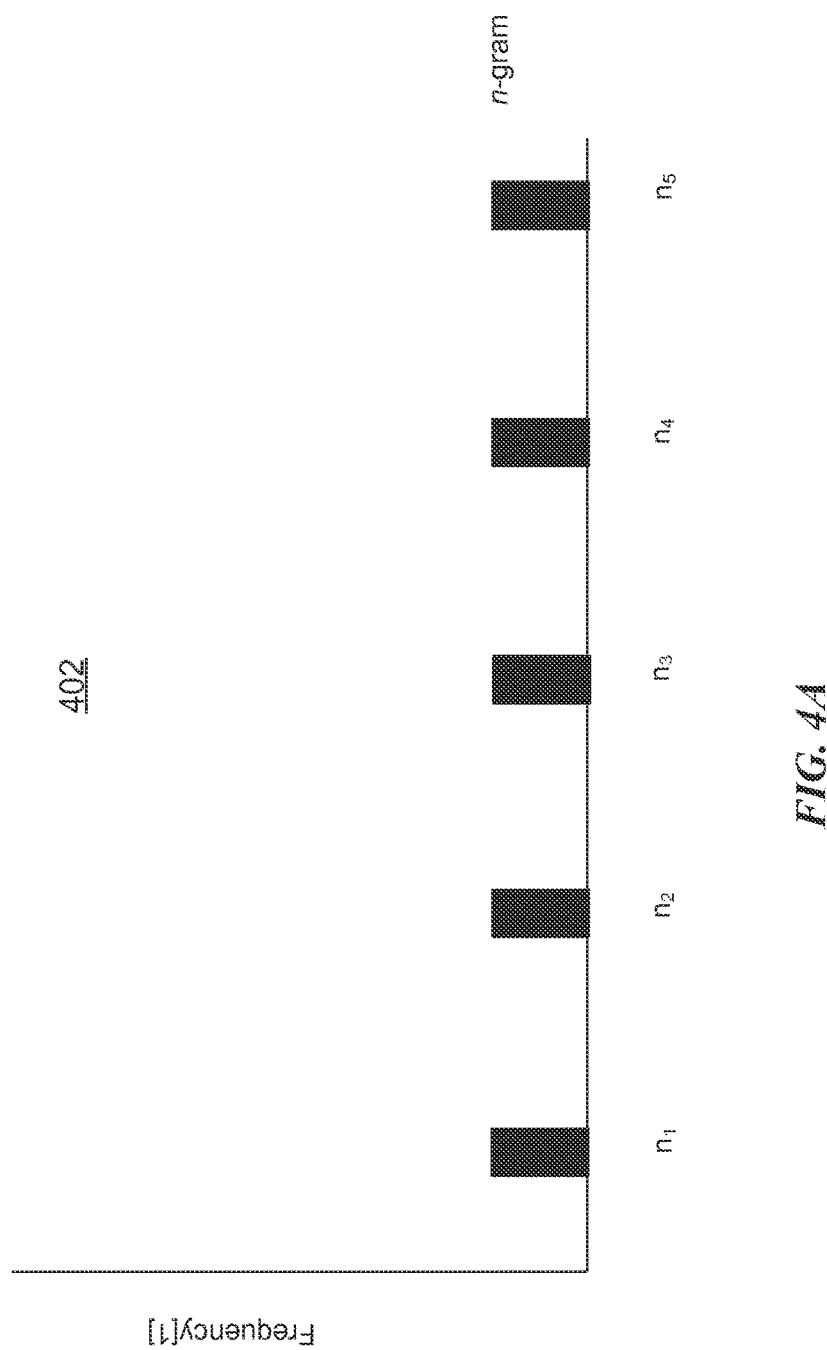
Figure 4C:
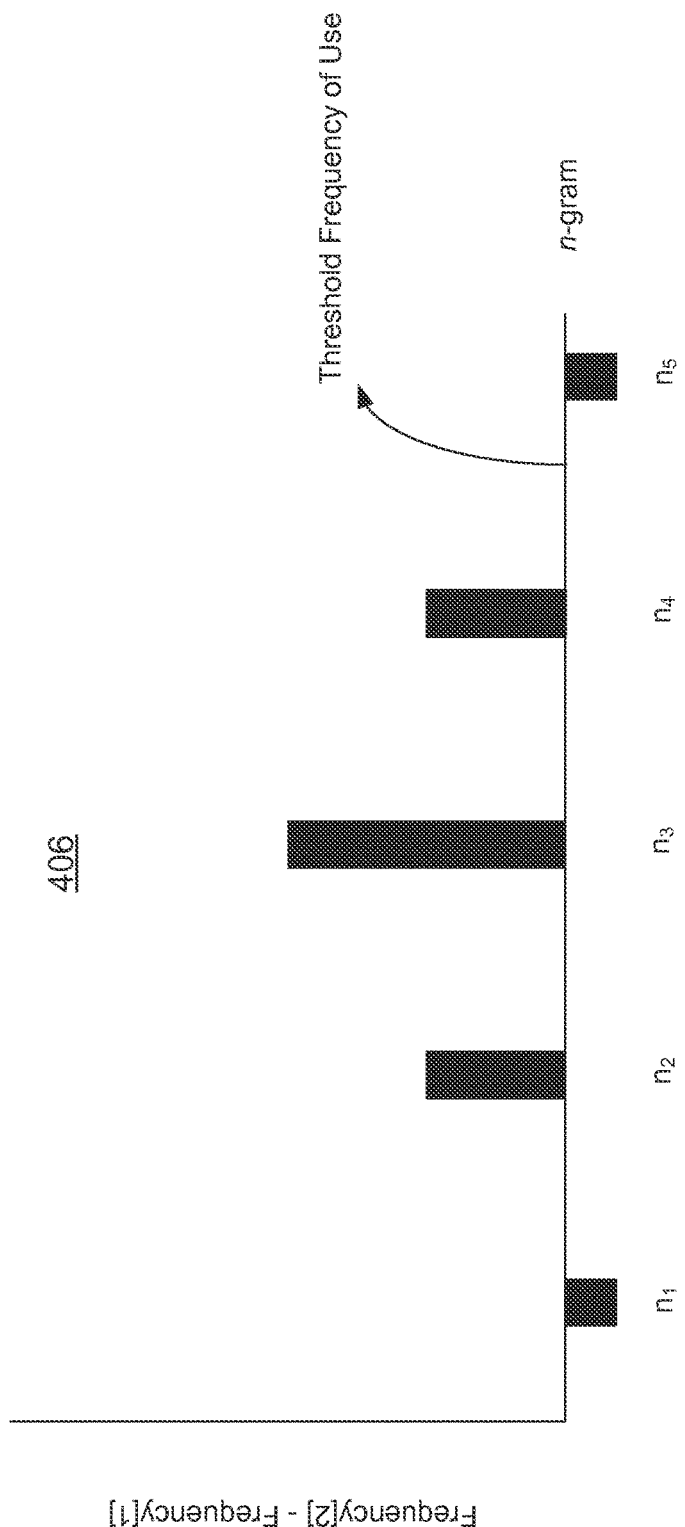
Figure 4D:
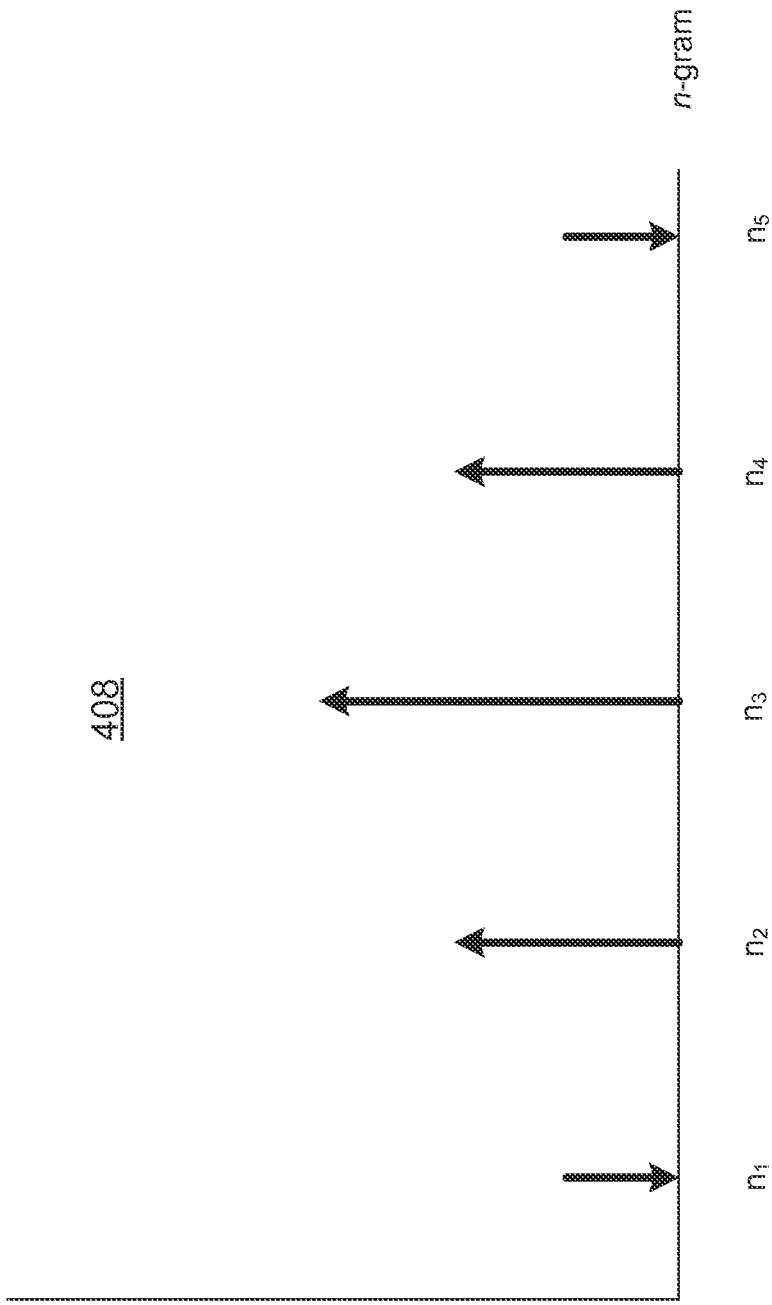

FIG. 3 illustrates contextual speller model 300. In particular embodiments, a contextual speller model 300 may comprise one or more speller sub-models. In the example of FIG. 3, contextual speller model 300 includes a hierarchy of speller sub-models 302A-306B. In particular embodiments, one or more of speller sub-models 302A-306B may be selectable by social-networking system 160. As an example and not by way of limitation, in response to a particular query at a particular time, contextual speller model 300 may only include speller sub-model 302B. In particular embodiments, each speller sub-model of contextual speller model 300 may include a subset of social-networking data for generating contextual speller model 300. As an example and not by way of limitation, speller sub-model 304C may include social-networking data of speller sub-models 306A-306B. As another example and not by way of limitation, speller sub-model 302A may include social-networking data of speller sub-models 304A-304C. As yet another example and not by way of limitation, contextual speller model 300 may include social-networking data of speller sub-models 302A-302B. In particular embodiments, one or more of speller sub-models 302A-306B may be selectable based at least on a desired social context relevant to the querying user. Speller sub-models 302A-306B may correspond to particular levels of aggregation that may distinguish a user, such as a user of a search engine, from global users, such as global users of the search engine, at each level of aggregation. In other words, each speller sub-model of speller sub-models 302A-306B may include social-networking data with particular social context relevant to the user of the search engine. As an example and not by way of limitation, contextual speller model 300 may be associated with a group of employees of a company. Accordingly, each speller sub-model of contextual speller model 300 may be differentiated by entities, such as departments, projects, and/or teams, of the company. As an example and not by way of limitation, speller sub-models 302A-302B may be associated with employees of department A and department B respectively. As another example and not by way of limitation, speller sub-models 304A-C may be associated with employees of projects A, B, and C respectively who are also working in department A. As yet another example and not by way of limitation, speller sub-models 306A-B may be associated with employees of team A and team B respectively who are also working in department A and project C. In particular embodiments, social-networking system 160 may deselect speller sub-model 302B from contextual speller model 300 for detecting and correcting misspelled search queries of user employees of department A. In particular embodiments, social-networking system 160 may deselect speller sub-models 302B and 304A-304B from contextual speller model 300 for detecting and correcting misspelled search queries of user employees of department A and project C. Although this disclosure describes contextual speller model 300 associated with a group of employees of a company, the disclosure contemplates contextual speller model 300 associated with any suitable entities in any suitable manner. As an example and not by way of limitation, contextual speller model 300 may be associated with a pre-determined group of users of social-networking system 160. The group of users may be friends of the querying user on social-networking system 160. The group of users may even be a subset of the friends of the querying user. In particular embodiments, the group of users may be manually determined by the querying user. In particular embodiments, the group of users may be generated by social-networking system 160 based at least on social-graph affinities between the querying user and one or more other users of social-networking system 160. In particular embodiments, the group of users may be determined based on a software application utilized by the querying user. As an example and not by way of limitation, the software application may be a messaging application, such as Facebook Messenger. Accordingly, the group of users may correspond to a list of users whom the querying user interacts with within the messaging application.

Speller sub-models 302A-306B of contextual speller model 300 may include social-networking data at particular time contexts associated with at least a user of the search engine. In particular embodiments, speller sub-models 302A-306B may include social-networking data retrieved from social-networking system 160 at various time intervals. As an example and not by way of limitation, speller sub-model 302A may include social-networking data retrieved from social-networking system 160 on weekly intervals. Speller sub-model 304C may include social-networking data retrieved from social-networking system 160 on every Friday and weekend. Furthermore, speller sub-model 306A may include social-networking data retrieved from social-networking system 160 on every Friday and speller sub-model 306B may include social-networking data retrieved from social-networking system 160 on every weekend. As another example and not by way of limitation, speller sub-model 302B (e.g., bootstrapped speller sub-model) may include social-networking data that one or more users of the search engine had previously interacted with in the past but has not recently interacted with. Such social-networking data may be retrieved from profiles and/or pages of the users on social-networking system 160. In particular embodiments, the bootstrapped speller sub-model 302B may be considered a back-up speller sub-model to be utilized by the search engine to detect and correct misspelled search queries. As yet another example and not by way of limitation, speller sub-model 302B may include social-networking data that the user of the search engine had recently interacted with. Although this disclosure describes and illustrates a particular contextual speller model comprising a particular hierarchy of particular speller sub-models, the disclosure contemplates any suitable contextual speller model comprising any suitable hierarchy of any suitable speller sub-models.

FIGS. 4A-4D (not necessarily drawn to scale) illustrate social-networking system 160 determining example changes in probabilities of n-grams. In particular embodiments, social-networking system 160 may determine frequencies of usage of particular n-grams by the querying user or groups associated with the querying user, and the probability of a particular n-gram appearing in a user's search query. The determined probabilities may represent the statistical likelihood of an n-gram being a correctly-spelled variant-token of a misspelled n-gram for a corresponding user's misspelled search query. In particular embodiments, an n-gram may include one or more uni-grams. As such, a probability of the n-gram appearing in the user's search query or corresponding to the correctly-spelled variant token may be based on a particular combination of each of the probabilities of the individual uni-grams of the n-gram appearing in the user's search query or corresponding to the correctly-spelled variant token. In particular embodiments, the probabilities of the n-grams or uni-grams may include a mathematical probability distribution. Furthermore, social-networking system 160 may determine each probability of the n-grams for generating the mathematical probability distribution. In particular embodiments, the mathematical probability distribution may be associated with a language model, such as a standard language model or a contextual speller model 300. As an example and not by way of limitation, the mathematical probability distribution may assign a probability to each n-gram of the language model appearing in a user's search query or corresponding to a correctly-spelled variant-token of a misspelled n-gram for a corresponding misspelled user's search query. Furthermore, the mathematical probability distribution may depend at least on the user associated with the misspelled search query. In particular embodiments, the mathematical probability distribution may depend on a time context (e.g., a time context of the social-networking data for generating contextual speller model 300 as discussed above), a social context (e.g., a social context of the social-networking data for generating contextual speller model 300 as discussed above), or any suitable combinations thereof. As such, the mathematical probability distribution may change when one or more probabilities of the n-grams change. Moreover, the mathematical probability distribution may change when new n-grams and their associated probabilities are added to the mathematical probability distribution. As an example and not by way of limitation, referencing FIG. 3, one or more mathematical probability distributions of n-grams may be generated for a subset of employees of the company based at least on the selected speller sub-models of contextual speller model 300.

In particular embodiments, one or more mathematical probability distributions of n-grams may be generated for the subset of employees of the company based at least on the entities (e.g., departments, projects, and/or teams of the company) of the subset of employees. Furthermore, one or more of the mathematical probability distributions may be combined in particular manners for use by the search engine for the subset of the employees. As an example and not by way of limitation, a first mathematical probability distribution may be associated with employees of department A (corresponding to speller sub-model 302A). A second mathematical probability distribution may be associated with employees of department B (corresponding to speller sub-model 302B). A third mathematical probability distribution may be associated with all employees of the company (corresponding to contextual speller model 300). Furthermore, the third mathematical probability distribution associated with contextual speller model 300 may be based at least on a combination of the first and second mathematical probability distributions corresponding to speller sub-models 302A and 302B respectively. Although this disclosure describes particular mathematical probability distributions of particular n-grams based on particular social contexts of particular contextual speller model, the disclosure contemplates any suitable mathematical probability distributions of any suitable n-grams based on any suitable social contexts of any suitable contextual speller model in any suitable manner. As an example and not by way of limitation, the mathematical probability distribution of n-grams may be based on particular time contexts associated with particular speller sub-models of contextual speller model 300 as discussed above.

The mathematical probability distribution of n-grams may be time variant. In other words, the usage of particular terms by particular users may change over time, and social-networking system 160 may monitor this usage on the online social network and update the mathematical probability distribution of n-grams accordingly. In particular embodiments, the mathematical probability distribution of n-grams may change based at least on a first time instance, such as a time at which the associated language model (e.g., contextual speller model 300) is generated, versus a second and later time instance, such as a time of the search query. As an example and not by way of limitation, beginning from the time of the search query, contextual speller model 300 may adapt as more social-networking data are retrieved from social-networking system 160 and added to contextual speller model 300. Accordingly, the mathematical probability distribution of n-grams associated with contextual speller model 300 may change. As another example and not by way of limitation, social-networking system 160 may retrieve n-grams "Michael" and "Mikael" from a contextual speller model, such as contextual speller model 300, as variant tokens for a misspelled n-gram "Michal." A probability that "Michael" or "Mikael" corresponds to a correctly-spelled variant token may be determined based at least on the number of times "Michael" or "Mikael" appears in social-networking data (e.g., a pre-determined set of posts created and/or viewed by the user of search engine on social-networking system 160) associated with the contextual speller model versus the total number of times "Michael" and "Mikael" appear in the social-networking data. At a first time instance, the probability associated with "Michael" may be higher than the probability associated with "Mikael." After a particular duration of time, more social-networking data may be added to the contextual speller model. The newly-added social-networking data may include additional occurrence of n-gram "Mikael" but no occurrences of n-gram "Michael." As such, the probability associated with "Mikael" may be higher than the probability associated with "Michael." Although this disclosure describes adapting particular mathematical probability distributions of particular n-grams in a particular manner, the disclosure contemplates adapting any suitable mathematical probability distributions of any suitable n-grams in any suitable manner.

In particular embodiments, the mathematical probability distribution of n-grams may change based at least on changes in a frequency distribution of the n-grams. As an example and not by way of limitation, the frequency distribution of n-grams associated with a language model may include a frequency of occurrences of each of the n-grams retrieved from the language model. In particular embodiments, frequency distribution 402 of n-grams $n_1$-$n_5$ may be associated with a standard language model as discussed above and frequency distribution 404 of n-grams $n_1$-$n_5$ may be associated with a personal language model based on social-networking data of the user of the search engine as discussed above. In particular embodiments, frequency distribution 402 may be associated with a first contextual speller model at a first time instance and frequency distribution 404 may be associated with a second contextual speller model at a second time instance. Furthermore, the second contextual speller model may be generated based at least on the first contextual speller model and newly-added social-networking data as discussed above. The first and second contextual speller models may also be based on different social-networking data (e.g., different personal language models) of the user. Although the disclosure describes and illustrates particular frequency distributions of particular n-grams in particular manners, the disclosure contemplates any suitable frequency distributions of any suitable n-grams in any suitable manners.

In particular embodiments, social-networking system 160 may generate frequency distribution 406 of n-grams $n_1$-$n_5$ based on frequency distributions 402 and 404. In the example of FIG. 4, frequency distribution 402 may be subtracted from frequency distribution 404 to generate frequency distribution 406, which represents the difference (delta) between the frequencies of use of n-grams $n_1$-$n_5$ in frequency distribution 402 (e.g., the standard language model (e.g., use of the n-grams by users generally)) versus use of n-grams $n_1$-$n_5$ in frequency distribution 404 (e.g., the contextual language model (e.g., use of the n-grams by the querying user)). In particular embodiments, social-networking system 160 may compare frequency[2]-frequency[1] of each n-gram in frequency distribution 406 with a threshold frequency of use to determine whether to increase or decrease a probability of the n-gram appearing in a user's search query. In other words, social-networking system 160 will determine whether delta in the frequency of use of a particular n-gram in the standard versus contextual language models is greater than a threshold delta, and this determination is then used when calculating the probability of a misspelled n-gram from a user's query as corresponding to a variant token of the particular n-gram. As an example and not by way of limitation, referencing probability distribution 408 of n-grams $n_1$-$n_5$, social-networking system 160 may decrease the probabilities of n-grams $n_1$ and $n_5$ appearing in the user's search query as their corresponding frequency[2]-frequency[1] are below the threshold frequency of use. As another example and not by way of limitation, social-networking system 160 may increase the probabilities of n-grams $n_2$, $n_3$, and $n_4$ appearing in the user's search query as their corresponding frequency[2]-frequency[1] are above the threshold frequency of use. Although this disclosure describes and illustrates a particular social-networking system determining particular changes in probabilities of particular n-grams appearing in a particular user's search query, the disclosure contemplates any suitable social-networking system determining any suitable changes in probabilities of any suitable n-grams appearing in any suitable user's search query in any suitable manner. As an example and not by way of limitation, social-networking system 160 may increase the probability of an n-gram appearing in the user's search query if its corresponding frequency[2]-frequency[1] is equivalent to the threshold frequency of use.

In particular embodiments, a search engine, such as a search engine of social-networking system 160, may score each n-gram retrieved from a language model, such as contextual speller model 300, for likely being a correctly-spelled variant token of a misspelled n-gram based at least on the mathematical probability distribution of n-grams associated with the language model as discussed above. As an example and not by way of limitation, referencing the example of n-grams "Michael" and "Mikael" as discussed above, the search engine may initially score n-gram "Michael" higher than n-gram "Mikael" at the first time instance. However, at the second time instance (i.e., at the end of the particular duration of time), as the probability associated with "Mikael" becomes higher than the probability associated with "Michael," the search engine may score n-gram "Mikael" higher than n-gram "Michael." Although this describes particular search engine scoring a particular n-gram based at least on particular mathematical probability distributions of n-grams associated with a particular language model in a particular manner, the disclosure contemplates any suitable search engine scoring any suitable n-gram based at least on any suitable mathematical probability distributions of n-grams associated with any suitable language model in any suitable manner.

Figure 5:
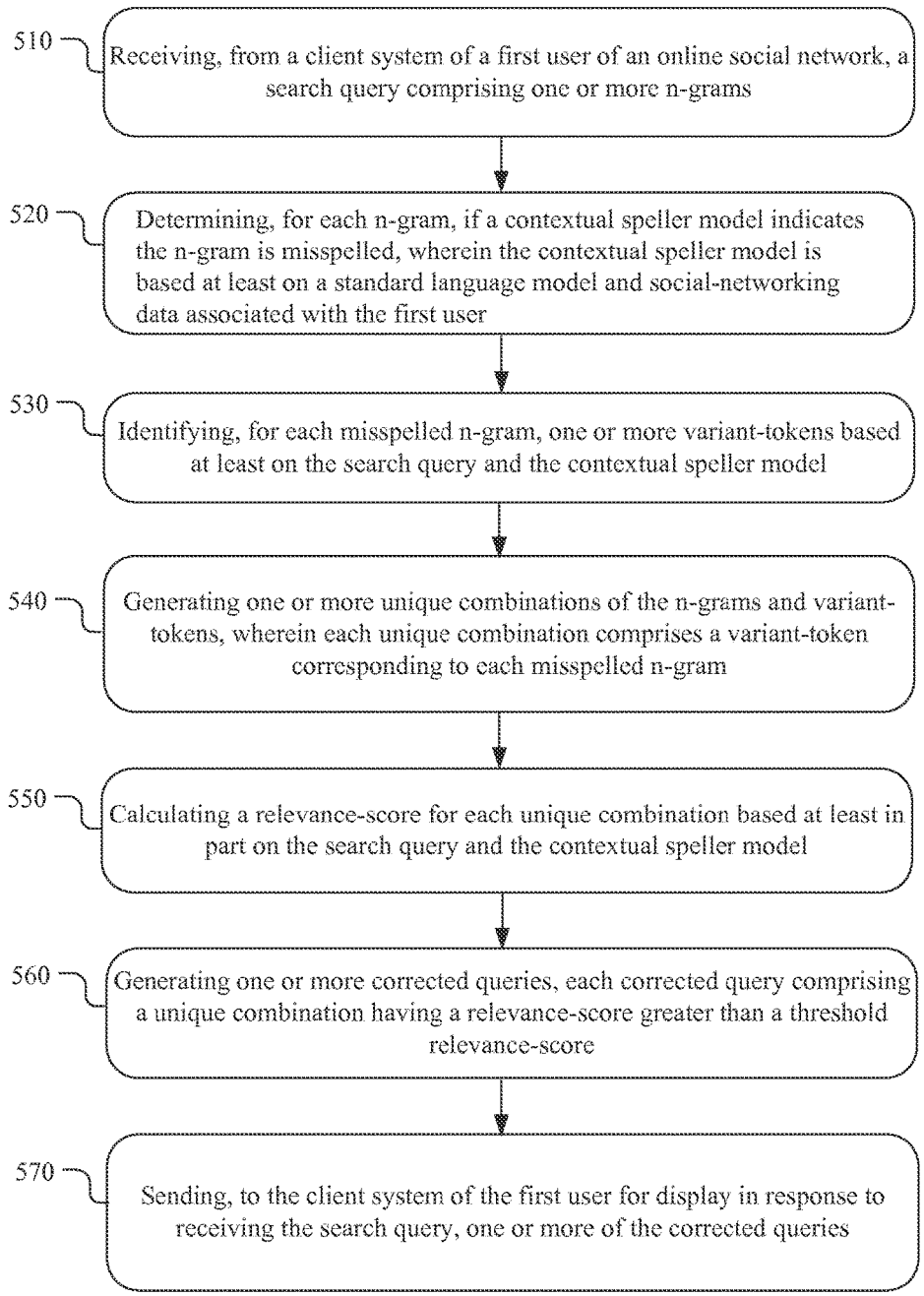
FIG. 5 illustrates an example method for detecting and correcting misspelled search queries.

FIG. 5 illustrates method 500 for detecting and correcting misspelled search queries. The method may begin at step 510, where an online social network may receive a search query comprising one or more n-grams from a client system of a first user of the online social network. As an example and not by way of limitation, social-networking system 160 may receive a search query comprising one or more n-grams from client system 130 of a first user of social-networking system 160. In particular embodiments, a search engine of social-networking system 160 may receive the search query. At step 520, the online social network may determine, for each n-gram, if a contextual speller model indicates the n-gram is misspelled. Furthermore, the contextual speller model may be based at least on a standard language model and social-networking data associated with the first user. As an example and not by way of limitation, social-networking system 160 may determine, for each n-gram, if contextual speller model 300 indicates the n-gram is misspelled. Contextual speller model 300 may be based at least on a standard language model and social-networking data associated with the first user. In particular embodiments, the social-networking data may include a personal language model associated with the first user, as discussed above. At step 530, the online social network may identify, for each misspelled n-gram, one or more variant-tokens based at least on the search query and the contextual speller model. As an example and not by way of limitation, social-networking system 160 may identify, for each misspelled n-gram, one or more variant-tokens based at least on the search query and contextual speller model 300. In particular embodiments, social-networking system 160 may access, for each misspelled n-gram, contextual speller model 300 to identify variant-tokens having probabilities of appearing in the search query greater than a threshold probability.

At step 540, the online social network may generate one or more unique combinations of the n-grams and variant-tokens. Furthermore, each unique combination may comprise a variant-token corresponding to each misspelled n-gram. As an example and not by way of limitation, social-networking system 160 may generate one or more unique combinations of the n-grams and variant-tokens. At step 550, the online social network may calculate a relevance-score for each unique combination based at least in part on the search query and the contextual speller model. As an example and not by way of limitation, social-networking system 160 may calculate a relevance-score for each unique combination based at least in part on the search query and contextual speller model 300. In particular embodiments, calculating the relevance-score for each unique combination based at least in part on the search query and contextual speller model 300 may include social-networking system 160 accessing, for each variant-token or n-gram of the unique combination, contextual speller model 300 to retrieve a probability of the variant-token or n-gram appearing in the search query. Furthermore, social-networking system 160 may calculate the relevance-score for the unique combination based at least on one or more of the retrieved probabilities. In particular embodiments, calculating the relevance-score for each unique combination based at least in part on the search query and contextual speller model 300 may include social-networking system 160 accessing, for each variant-token of the unique combination, contextual speller model 300 to determine a probability of the variant-token being correctly-spelled. Furthermore, social-networking system 160 may calculate the relevance-score for the unique combination based at least on one or more of the determined probabilities corresponding to the variant-tokens of the unique combination.

At step 560, the online social network may generate one or more corrected queries, where each corrected query comprises a unique combination having a relevance-score greater than a threshold relevance-score. As an example and not by way of limitation, social-networking system 160 may generate the corrected queries, where each corrected query comprises a unique combination having a relevance-score greater than the threshold relevance-score. At step 570, the online social network may send one or more of the corrected queries to the client system of the first user for display in response to receiving the search query. As an example and not by way of limitation, social-networking system 160 may send one or more of the corrected queries to client system 130 of the first user for display in response to receiving the search query. In particular embodiments, social-networking system 160 may receive a selection of one of the corrected queries from the first user. In particular embodiments, social-networking system 160 may identify one or more objects matching the selected query. In particular embodiments, social-networking system 160 may send, to client system 130 of the first user, a search-result page responsive to the selected query. Furthermore, the search-results page may comprise one or more references to one or more of the identified objects, respectively. Particular embodiments may repeat one or more steps of method 500 of FIG. 5, where appropriate. Although this disclosure describes and illustrates particular steps of method 500 of FIG. 5 as occurring in a particular order, this disclosure contemplates any suitable steps of method 500 of FIG. 5 occurring in any suitable order. Moreover, although this disclosure describes and illustrates an example method for detecting and correcting misspelled search queries including the particular steps of method 500 of FIG. 5, this disclosure contemplates any suitable method for detecting and correcting misspelled search queries including any suitable steps, which may include all, some, or none of the steps of method 500 of FIG. 5, where appropriate. Furthermore, although this disclosure describes and illustrates particular components, devices, or systems carrying out particular steps of method 500 of FIG. 5, this disclosure contemplates any suitable combination of any suitable components, devices, or systems carrying out any suitable steps of method 500 of FIG. 5.

Spell Correction with Hidden Markov Models

In particular embodiments, social-networking system 160 may determine an optimal candidate variant token to correct a misspelled n-gram in a search query by considering at least candidate variant tokens and/or n-grams for one or more n-grams that precede the misspelled n-gram. In particular embodiments, social-networking system 160 may consider an n-gram of the misspelled search query as a candidate variant token. Furthermore, the determination of the optimal candidate variant token may be utilized by a search engine, such as a search engine of social-networking system 160, to score individual candidate variant tokens generated for each misspelled n-gram. Although this disclosure describes determining optimal candidate variant tokens for correcting misspelled n-grams in search queries, this disclosure contemplates determining optimal candidate variant tokens for correcting misspelled n-grams in any suitable context. As an example and not by way of limitation, social-networking system 160 may determine an optimal candidate variant token to correct misspelled n-grams in any suitable user input, such as form entry fields, messaging applications, post/comment entry fields, or other suitable user inputs.

More information on correcting misspelled n-grams in a misspelled search query may be found in U.S. patent application Ser. No. 14/556,368, filed 2 Dec. 2014, which is incorporated by reference.

In particular embodiments, the search engine may consider at least one or more of the preceding candidate variant tokens and/or n-grams to select an optimal candidate variant token to correct the misspelled n-gram. As an example and not by way of limitation, a user may enter n-grams "kandy crash sagax" as a search query instead of the actual search query "candy crush saga" corresponding to a title of a game. Thereafter, the search engine may determine that all uni-grams of "kandy crash sagax" are misspelled. Furthermore, the search engine may identify uni-gram candidate variant tokens—"candy", "kandy", and "andy"—for the first misspelled uni-gram "kandy"; uni-gram candidate variant tokens—"crash", "crush", and "cash"—for the second misspelled uni-gram "crash"; and uni-gram candidate variant tokens—"saga" and "sagax"—for the third misspelled uni-gram "sagax." The search engine may select a candidate variant token for the misspelled uni-gram "crash" independently and without considering candidate variant tokens generated for preceding misspelled uni-gram "kandy." Furthermore, it may even be hard for the search engine to select between candidate variant tokens "crash" and "crush" without the context of the rest of the candidate variant tokens (e.g., preceding candidate variant tokens) as previously discussed. Accordingly, the search engine may determine n-gram "candy crash saga" to be the correctly-spelled search query, instead of "candy crush saga," thereby incorrectly spell-correcting the search query.

In particular embodiments, social-networking system 160 may utilize a hidden Markov model (HMM) to consider one or more features (e.g., feature values) of preceding candidate variant tokens in order to determine an optimal candidate variant token for correcting a misspelled n-gram. In particular embodiments, a bi-gram feature value, such as FeatureValue of FIGS. 6A-6B, may be calculated for every pair of candidate variant tokens corresponding to neighboring bi-grams of the misspelled search query. Furthermore, the bi-gram feature value may include features of both candidate variant tokens. As an example and not by way of limitation, referencing the misspelled search query "kandy crash sagax" as discussed above, a first bi-gram feature value, such as FeatureValue("crush"|"crash", "candy"), may be calculated for candidate variant tokens "candy" and "crush" corresponding to neighboring bi-gram "kandy crash." As another example and not by way of limitation, a second bi-gram feature value, such as FeatureValue("saga"|"sagax", "crush"), may be calculated for candidate variant tokens "crush" and "saga" corresponding to neighboring bi-gram "crash sagax." In particular embodiments, each bi-gram feature value may be calculated based at least on a transitional logarithmic probability p where p=P (x|y, z), and where x=a candidate variant-token corresponding to an n-gram of a misspelled search query, y=the n-gram of the misspelled search query as entered by the user, and z=a candidate variant-token corresponding to an n-gram immediately preceding the n-gram of the misspelled search query. As an example and not by way of limitation, referencing the misspelled search query "kandy crash sagax" as discussed above, FeatureValue("crush"|"crash", "candy") may be calculated based at least on a transitional logarithmic probability that the user (i.e., user who enters the misspelled search query) meant "crush" given that the user typed "crash" and a selected candidate variant token corresponding to misspelled n-gram "kandy" is "candy." Accordingly, as FeatureValue("crush"|"crash", "candy") increases, it may be more likely that "crush" is a suitable candidate variant token to correct misspelled n-gram "crash." In contrast, as FeatureValue("crush"|"crash", "candy") decreases, it may be less likely that "crush" is a suitable candidate variant token to correct misspelled n-gram "crash." Furthermore, each transitional logarithmic probability may be calculated based at least on one or more language models. As an example and not by way of limitation, the transitional logarithmic probability may be calculated based at least on a contextual speller model, such as contextual speller model 300, as discussed above. In particular embodiments, the transitional logarithmic probability may be determined based at least on a Perceptron training algorithm taking into consideration one or more suitable language models. Although this disclosure describes utilizing HMM to correct a particular misspelled n-gram in a particular manner, this disclosure contemplates utilizing any suitable statistical models/algorithms to correct any suitable misspelled n-grams in any suitable manner. Moreover, although this disclosure describes determining a particular bi-gram feature value in a particular manner, the disclosure contemplates determining any suitable bi-gram feature value in any suitable manner.

In particular embodiments, social-networking system 160 may calculate a bi-gram feature value for a candidate variant token corresponding to the first uni-gram of the misspelled search query. Social-networking system 160 may even calculate a bi-gram feature value for a candidate variant token corresponding to an n-gram of the misspelled search query when there are no n-grams preceding the n-gram in the misspelled search query. As an example and not by way of limitation, referencing the misspelled search query "kandy crash sagax" as discussed above, a bi-gram feature value for "candy" may be FeatureValue("candy"|"kandy", BEGIN), where BEGIN is a pre-determined placeholder, such as ASCII symbol corresponding to (space). Furthermore, FeatureValue("candy"|"kandy", BEGIN) may be calculated based on a transitional logarithmic probability that the user meant "candy" given that the user typed "kandy" and a selected candidate variant token preceding "candy" is the pre-determined placeholder BEGIN. Although this disclosure describes calculating a particular bi-gram feature value in a particular manner, the disclosure contemplates calculating any suitable bi-gram feature value in any suitable manner.

In particular embodiments, social-networking system 160 may calculate a sequence-score corresponding to a particular sequence of candidate variant tokens for correcting a misspelled search query. Referencing the misspelled search query "kandy crash sagax" as discussed above, social-networking system 160 may calculate a sequence-score based at least on a sum of the selected individual bi-gram feature values associated with the sequence of candidate variant tokens for correcting "kandy crash sagax." As an example and not by way of limitation, a sequence-score (e.g., SequenceScore("candy crush saga"|"kandy crash sagax")) for a selected sequence of candidate variant tokens (e.g., "candy crush saga") may be calculated based at least on a sum of FeatureValue ("candy"|"kandy", <space>), FeatureValue("crush"|"crash", "candy"), and FeatureValue ("saga" "sagax", "crush"). Although this disclosure describes calculating a particular sequence score in a particular manner, the disclosure contemplates calculating any suitable sequence score in any suitable manner.

In particular embodiments, social-networking system 160 may determine a k-dimension feature vector (e.g., 1×k or k×1 feature vector) based at least on a selected k number of individual bi-gram feature values associated with the sequence of k candidate variant tokens for correcting a misspelled search query. As an example and not by way of limitation, a 1×3 feature vector for a selected sequence of 3 candidate variant tokens (e.g., "candy crush saga") may be expressed as FeatureVector("candy crush saga"|"kandy crash sagax"), where FeatureVector("candy crush saga"|"kandy crash sagax")=[FeatureValue("candy"|"kandy", <space>) FeatureValue("crush"|"crash", "candy") FeatureValue("saga"|"sagax", "crush")]. Furthermore, social-networking system 160 may calculate a sequence-score for the selected sequence of k candidate variant tokens based at least on the generated k-dimension feature vector. As an example and not by way of limitation, social-networking system 160 may calculate the sequence-score based on a dot product of the generated k-dimension feature vector and a suitable pre-determined k-dimension weighted vector. As such, each bi-gram feature value (e.g., FeatureValue) of the generated k-dimension feature vector may be weighted by a corresponding scalar value of the pre-determined weighted vector. In particular embodiments, the pre-determined weighted vector (or one or more of the scalar values of the pre-determined weighted vector) may be determined manually and/or determined by one or more learning algorithms. As an example and not by way of limitation, one of the learning algorithms may be a Perceptron training algorithm. Furthermore, social-networking system 160 may select an optimal sequence of k candidate variant tokens that has the highest sequence-score (e.g., dot product) of the generated k-dimension feature vector and the suitable pre-determined k-dimension weighted vector. As such, social-networking system 160 may select the optimal sequence of candidate variant tokens with a maximum summation of the features of the candidate variant tokens further corresponding to a maximum log of the joint transitional probabilities provided by the individual bi-gram feature values. Although this disclosure describes determining a particular feature vector for correcting a particular misspelled search query in a particular manner, the disclosure contemplates determining any suitable feature vector for correcting any suitable misspelled search query in any suitable manner.

In particular embodiments, social-networking system 160 may generate n-gram candidate variant tokens (e.g., bi-gram, tri-gram, etc.) corresponding to a uni-gram of the misspelled search query. As an example and not by way of limitation, referencing a misspelled search query "candy crushsaga", a search engine, such as a search engine of social-networking system 160, may generate "crush saga" as bi-gram candidate variant tokens for the uni-gram "crushsaga." In particular embodiments, social-networking system 160 may utilize HMM to calculate at least two bi-gram feature values for the generated bi-gram candidate variant tokens. As an example and not by way of limitation, social-networking system 160 may utilize HMM to calculate FeatureValue("crush"|"crushsaga", "candy") and FeatureValue("saga"|"crushsaga", "crush") for the generated "crush saga" candidate variant tokens. Furthermore, the search engine may combine one or more of the calculated bi-gram feature values into a single bi-gram feature value. As an example and not by way of limitation, the search engine may average FeatureValue("crush"|"crushsaga", "candy") and FeatureValue("saga"|"crushsaga", "crush") to calculate FeatureValue ("crush saga"|"crushsaga", "candy"). Although this disclosure describes generating particular n-gram candidate variant tokens in a particular manner, the disclosure contemplates generating any suitable n-gram candidate variant tokens in any suitable manner.

In particular embodiments, social-networking system 160 may utilize a Viterbi dynamic programming algorithm to determine an optimal sequence of candidate variant tokens for correcting a misspelled search query. Furthermore, social-networking system 160 may utilize a Viterbi dynamic programming algorithm to determine a maximum summation of the bi-gram feature values of the candidate variant tokens efficiently. The Viterbi dynamic programming algorithm may enable social-networking system 160 to reduce resources, such as computing hardware and/or time, for determining the optimal sequence of candidate variant tokens. As an example and not by way of limitation, referencing the misspelled search query "kandy crash sagax" as discussed above, without utilizing any dynamic programming algorithms, social-networking system 160 may execute steps that include generating eighteen possible candidate variant token sequences based at least on the three identified uni-gram candidate variant tokens for misspelled n-gram "kandy," three identified uni-gram candidate variant tokens for misspelled n-gram "crash," and two identified uni-gram candidate variant tokens for misspelled n-gram "sagax" (i.e., 3×3×2=18). Thereafter, social-networking system 160 may execute steps that include storing data corresponding to the eighteen possible candidate variant token sequences in computer storage, calculating a sequence-score for each of the eighteen possible candidate variant token sequences, and determining an optimal candidate variant token sequence having the highest sequence-score. However these steps may not be efficient. In contrast, social-networking system 160 may utilize Viterbi dynamic programming algorithm to iteratively determine, for each candidate variant token corresponding to an n-gram of the misspelled search query, an optimal bi-gram candidate variant tokens taking into consideration one or more candidate variant tokens corresponding to an n-gram preceding the n-gram of the misspelled search query. As an example and not by way of limitation, referencing candidate variant token "crush" for the misspelled search query "kandy crash sagax" as discussed above, social-networking system 160 may determine an optimal bi-gram candidate variant tokens among "candy crush", "kandy crush", and "andy crush." As an example and not by way of limitation, social-networking system 160 may determine "candy crush" as the optimal bi-gram candidate variant tokens for having the highest value among FeatureValue("crush"|"candy", "crash"), FeatureValue("crush-"|"candy", "kandy"), and FeatureValue("crush"|"candy", "andy"). Thereafter, when considering next candidate variant token (i.e., "sagax" or "saga") to complete the optimal sequence of candidate variant tokens (e.g., "candy crush saga"), social-networking system 160 may merely consider the previously-determined optimal bi-gram candidate variant tokens (e.g., "candy crush"). Although this disclosure describes determining a particular sequence of candidate variant tokens in a particular manner, this disclosure contemplates determining any suitable sequence of candidate variant tokens in any suitable manner.

Figure 6A:
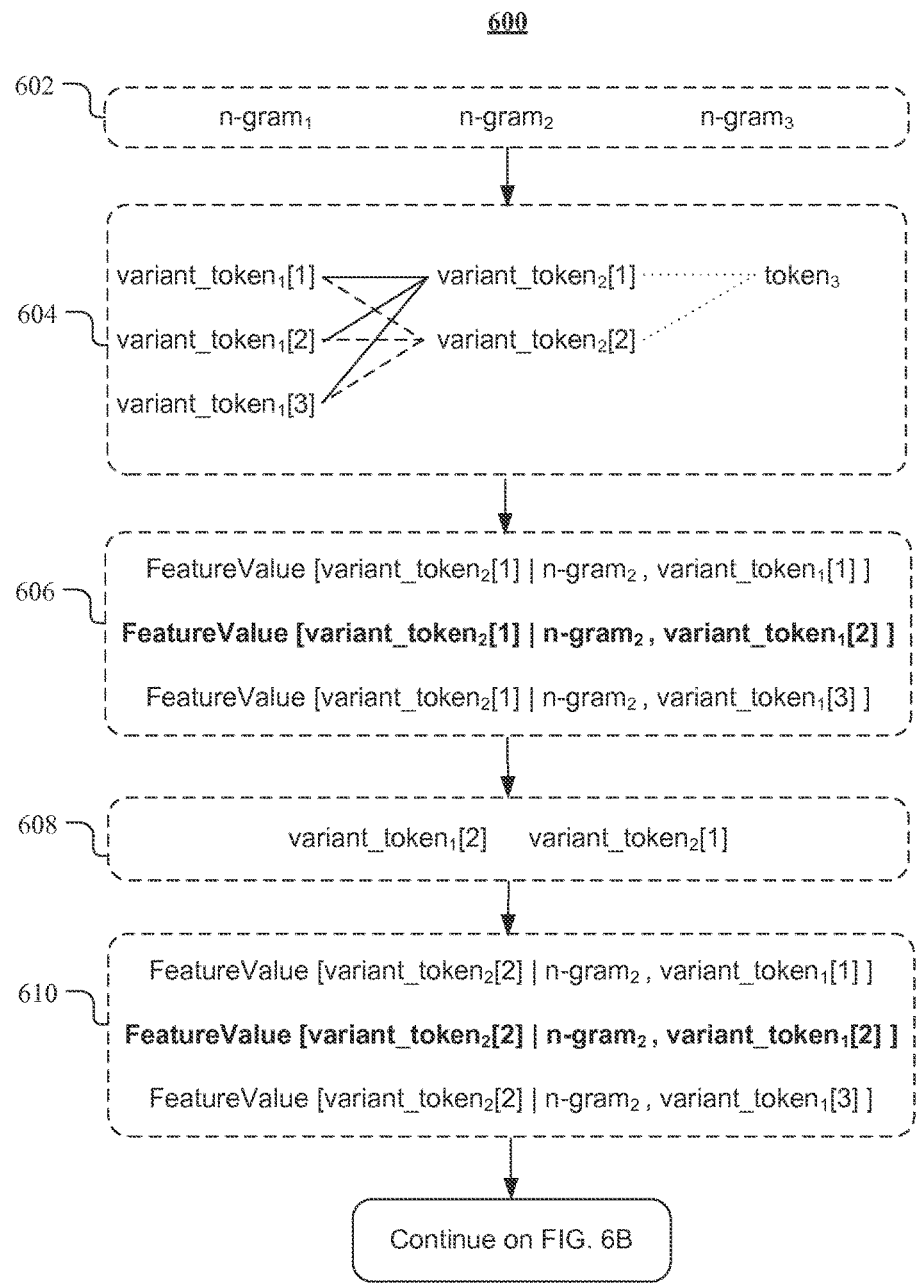
FIGS. 6A-6B illustrate an example data transformation flow associated with correcting a misspelled search query.
Figure 6B:
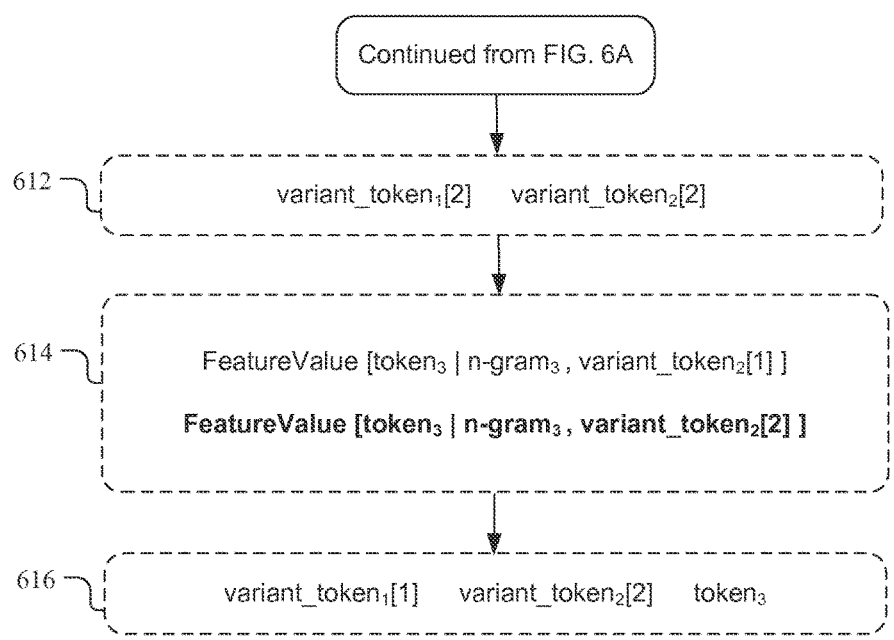

FIGS. 6A-6B illustrate an example data transformation flow 600 associated with correcting a misspelled search query. In particular embodiments, social-networking system 160 may retrieve data 602 corresponding to a search query from a search engine, such as a search engine of social-networking system 160. In the example of data transformation flow 600, data 602 may include n-gram$_1$ (e.g., "micael"), n-gram$_2$ (e.g., "tomas"), and n-gram$_3$ (e.g., "smith"). Furthermore, social-networking system 160 may determine that n-gram$_1$ and n-gram$_2$ are misspelled. In particular embodiments, social-networking system 160 may determine that n-gram$_1$ and n-gram$_2$ are misspelled based at least on one or more language models. In particular embodiments, social-networking system 160 may generate data 604 including candidate variant tokens for each misspelled n-grams. In the example of data transformation flow 600, data 604 may include at least generated variant_token$_1$[1-3] (e.g., "mikael", "michael", and "micael") for misspelled n-gram$_1$ and generated variant_token$_2$[1-2] (e.g., "thomas" and "tomas") for misspelled n-gram$_2$. Furthermore, data 604 may include token$_3$ (e.g., "smith") corresponding to n-gram$_3$. In particular embodiments, social-networking system 160 may utilize a statistical model, such as HMM as discussed above, to generate data 606 including bi-gram feature values for variant-token$_2$[1] (e.g., "thomas") based at least on n-gram$_2$ and candidate variant tokens, such as variant_token$_1$[1-3], for correcting misspelled n-gram$_1$. In the example of data transformation flow 600, data 606 may include at least FeatureValue[variant_token$_2$[1]|n-gram$_2$, variant_token$_1$[1]] (e.g., FeatureValue["thomas"|"tomas", "mikael"]), FeatureValue[variant_token$_2$[1]|n-gram$_2$, variant_token$_1$[2]] (e.g., FeatureValue["thomas"|"tomas", "michael" ]), and FeatureValue[variant_token$_2$[1]|n-gram$_2$, variant_token$_1$[3]] (e.g., FeatureValue["thomas"|"tomas", "micael"]). In particular embodiments, social-networking system 160 may utilize a dynamic programming algorithm, such as Viterbi dynamic programming algorithm as discussed above, to determine an optimal bi-gram candidate variant tokens for variant_token$_2$[1] having the highest bi-gram feature value based at least on data 606. In the example of data transformation flow 600, social-networking system 160 may determine that "variant_token$_1$[2] variant_token$_2$[1]" of data 608 (e.g., "michael thomas") as the optimal bi-gram candidate variant tokens for having the highest bi-gram feature value (i.e., FeatureValue[variant_token$_2$[1]|n-gram$_2$, variant_token$_1$[2]]). In particular embodiments, social-networking system 160 may utilize the statistical model to generate data 610 including bi-gram feature values for variant-token$_2$[2] (e.g., "tomas") based at least on n-gram$_2$ and candidate variant tokens, such as variant_token$_1$[1-3], for correcting misspelled n-gram$_1$. In the example of data transformation flow 600, data 610 may include at least FeatureValue[variant_token$_2$[2]|n-gram$_2$, variant_token$_1$[1]] (e.g., FeatureValue["tomas"|"tomas", "mikael" ]), FeatureValue[variant_token$_2$[2]|n-gram$_2$, variant_token$_1$[2]](e.g., FeatureValue["tomas"|"tomas", "michael" ]), and FeatureValue[variant_token$_2$[2]|n-gram$_2$, variant_token$_1$[3]] (e.g., FeatureValue["tomas"|"tomas", "micael" ]). In particular embodiments, social-networking system 160 may utilize the dynamic programming algorithm to determine an optimal bi-gram candidate variant tokens for variant_token$_2$[2] having the highest bi-gram feature value based at least on data 610. In the example of data transformation flow 600, social-networking system 160 may determine that "variant_token$_1$[2] variant_token$_2$[2]" of data 612 (e.g., "michael tomas") as the optimal bi-gram candidate variant tokens for having the highest bi-gram feature value (i.e., FeatureValue[variant_token$_2$[2]|n-gram$_2$, variant_token$_1$[2]]).

In particular embodiments, social-networking system 160 may utilize the statistical model to generate data 614 including bi-gram feature values for token$_3$ based at least on n-gram$_3$ and candidate variant tokens, such as variant_token$_2$[1-2], for correcting misspelled n-gram$_2$. In the example of data transformation flow 600, data 614 may include at least FeatureValue[token$_3$|n-gram$_3$, variant_token$_2$[1]] (e.g., FeatureValue["smith"|"smith", "thomas"]) and FeatureValue[token$_3$|n-gram$_3$, variant_token$_2$[2]] (e.g., FeatureValue["smith"|"smith", "tomas"]). In particular embodiments, social-networking system 160 may utilize the dynamic programming algorithm to determine an optimal bi-gram candidate variant tokens for token$_3$ having the highest bi-gram feature value based at least on data 614. In the example of data transformation flow 600, social-networking system 160 may determine "variant_token$_2$[2] token$_3$" (e.g., "tomas smith") as the optimal bi-gram candidate variant tokens for having the highest bi-gram feature value (i.e., FeatureValue[token$_3$|n-gram$_3$, variant_token$_2$[2]]). Furthermore, social-networking system 160 may utilize the dynamic programming algorithm to determine, based at least on the determined optimal bi-gram candidate variant tokens (i.e., "variant_token$_2$[2] token$_3$") for token$_3$ and the preceding determined optimal bi-gram candidate tokens (i.e., "variant_token$_1$[2] variant_token$_2$[2]") for variant_token$_2$[2], that "variant_token$_1$[1] variant_token$_2$[2] token$_3$" of data 616 (e.g., "michael tomas smith") corresponds to an optimal sequence of candidate variant tokens for the misspelled search query of data 602. In particular embodiments, social-networking system 160 may send data 616 as a corrected search query to the search engine. Although this disclosure describes and illustrates particular steps of data transformation flow 600 as occurring in a particular order, this disclosure contemplates any suitable steps of data transformation flow 600 occurring in any suitable order. Moreover, although this disclosure describes and illustrates particular data transformation flow associated with particular social-networking system 160 for correcting particular misspelled search query including the particular steps of data transformation flow 600, this disclosure contemplates any suitable data transformation flow associated with any suitable social-networking system for correcting any suitable misspelled search query including any suitable steps, which may include all, some, or none of the steps of data transformation flow 600, where appropriate. Moreover, although this disclosure describes and illustrates particular components, devices, or systems carrying out particular steps of data transformation flow 600, this disclosure contemplates any suitable combination of any suitable components, devices, or systems carrying out any suitable steps of data transformation flow 600.

Figure 7:
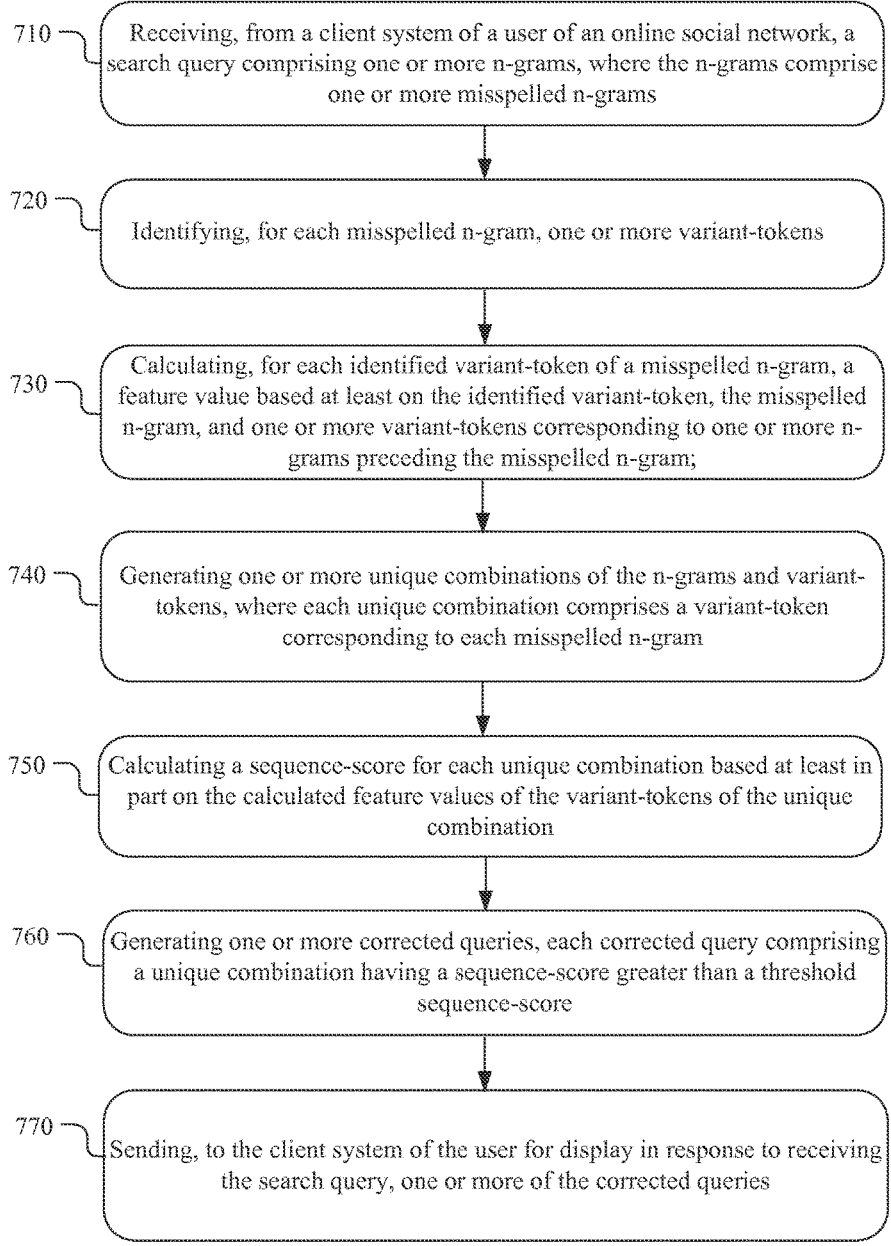
FIG. 7 illustrates an example method for correcting misspelled search queries.

FIG. 7 illustrates method 700 for correcting misspelled search queries. The method may begin at step 710, where an online social network may receive, from a client system of a user of the online social network, a search query comprising one or more n-grams. Furthermore, the n-grams may comprise one or more misspelled n-grams. As an example and not by way of limitation, referencing FIGS. 6A-6B, social-networking system 160 may receive, from client system 130 of a user of social-networking system 160, search query 602 comprising n-gram$_1$, n-gram$_2$, and n-gram$_3$. Furthermore, search query 602 may include misspelled n-gram$_1$ and n-gram$_2$. At step 720, the online social network may identify one or more variant-tokens (e.g., candidate variant tokens) for each misspelled n-gram. As an example and not by way of limitation, referencing FIGS. 6A-6B, social-networking system 160 may identify variant_token$_1$[1-3] for misspelled n-gram$_1$ and variant_token$_2$[1-2] for misspelled n-gram$_2$. At step 720, the online social network may calculate, for each identified variant-token of a misspelled n-gram, a feature value based at least on the identified variant-token, the misspelled n-gram, and one or more variant-tokens corresponding to one or more n-grams preceding the misspelled n-gram. As an example and not by way of limitation, referencing FIGS. 6A-6B, social-networking system 160 may calculate FeatureValue[variant_token$_2$[1]|n-gram$_2$, variant_token$_1$[1]], FeatureValue[variant_token$_2$[1]|n-gram$_2$, variant_token$_1$[2]], and FeatureValue[variant_token$_2$[1]|n-gram$_2$, variant_token$_1$[3]] for variant-token$_2$[1] of misspelled n-gram$_2$. As another example and not by way of limitation, referencing FIGS. 6A-6B, social-networking system 160 may calculate FeatureValue[variant_token$_2$[2]|n-gram$_2$, variant_token$_1$[1]], FeatureValue[variant_token$_2$[2]|n-gram$_2$, variant_token$_1$[2]], and FeatureValue[variant_token$_2$[2]|n-gram$_2$, variant_token$_1$[3]] for variant-token$_2$[2] of misspelled n-gram$_2$. At step 740, the online social network may generate one or more unique combinations of the n-grams and variant-tokens, where each unique combination comprises a variant-token corresponding to each misspelled n-gram. As an example and not by way of limitation, social-networking system 160 may generate one or more unique combinations of n-gram$_3$, variant-token$_1$[1-3], and variant-token$_2$[1-2]. In particular embodiments, the online social network may utilize Viterbi dynamic programming algorithm to generate the unique combinations of the n-grams and variant-tokens as discussed above. As an example and not by way of limitation, referencing FIGS. 6A-6B, social-networking system 160 may generate "variant_token$_1$[1] variant_token$_2$[2] token$_3$" as a unique combination.

At step 760, the online social network may calculate a sequence-score for each unique combination based at least in part on the calculated feature values of the variant-tokens of the unique combination. As an example and not by way of limitation, social-networking system 160 may calculate a sequence-score for each unique combination based at least in part on the calculated FeatureValues of the variant-tokens of the unique combination. In particular embodiments, the calculated sequence-score for each unique combination is based at least in part on a calculated sum of the calculated feature values of the variant-tokens of the unique combination as discussed above. In particular embodiments, the online social network may weigh each of the calculated feature values of the variant-tokens of the unique combination by a pre-determined scalar value. Furthermore, the online social network may calculate the sequence-score of the unique combination based at least on the weighted calculated feature values of the variant-tokens of the unique combination. At step 780, the online social network may send, to the client system of the user for display in response to receiving the search query, one or more of the corrected queries. As an example and not by way of limitation, social-networking system 160 may send to client system 130 of the user for display in response to receiving search query 602, one or more of the corrected queries. In particular embodiments, the online social network may receive a selection of one of the corrected queries from the user. The online social network may identify one or more objects matching the selected query. Thereafter, the online social network may send a search-result page responsive to the selected query to the client system of the user. In particular embodiments, the search-results page may comprise one or more references to one or more of the identified objects, respectively. Although this disclosure describes and illustrates particular steps of method 700 of FIG. 7 as occurring in a particular order, this disclosure contemplates any suitable steps of method 700 of FIG. 7 occurring in any suitable order. Moreover, although this disclosure describes and illustrates an example method for correcting misspelled search queries including the particular steps of method 700 of FIG. 7, this disclosure contemplates any suitable method for correcting misspelled search queries including any suitable steps, which may include all, some, or none of the steps of method 700 of FIG. 7, where appropriate. Furthermore, although this disclosure describes and illustrates particular components, devices, or systems carrying out particular steps of method 700 of FIG. 7, this disclosure contemplates any suitable combination of any suitable components, devices, or systems carrying out any suitable steps of method 700 of FIG. 7.

Social Graph Affinity and Coefficient

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph #00, social-networking system 160 may analyze the number and/or type of edges #06 connecting particular user nodes #02 and concept nodes #04 when calculating a coefficient. As an example and not by way of limitation, user nodes #02 that are connected by a spouse-type edge (representing that the two users are married) may be assigned a higher coefficient than a user nodes #02 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph #00. As an example and not by way of limitation, social-graph entities that are closer in the social graph #00 (i.e., fewer degrees of separation) may have a higher coefficient than entities that are further apart in the social graph #00.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

System and Methods

Figure 8:
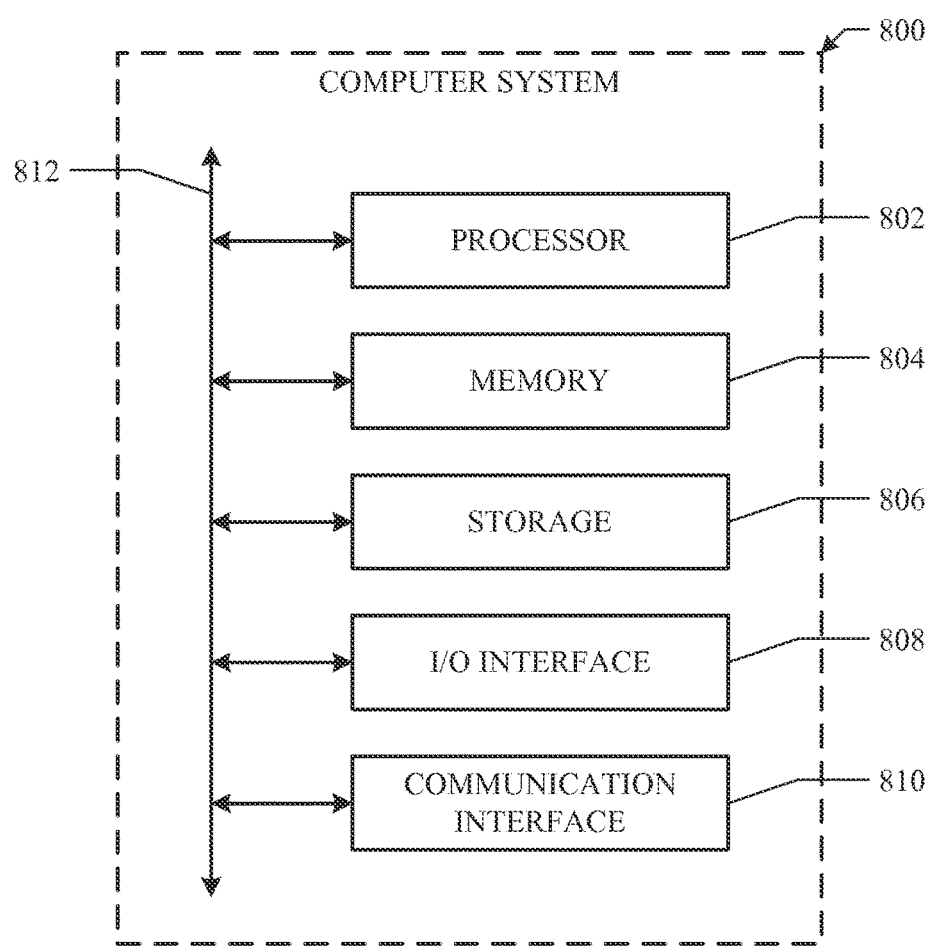
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing devices:

receiving, from a client system of a first user of an online social network, a search query comprising one or more n-grams;

determining, based on a contextual speller model, that at least one n-gram of the one or more n-grams is misspelled, wherein the contextual speller model is based at least on a standard language model and a personal language model customized for the first user based on social-networking data associated with the first user;

identifying, for each misspelled n-gram, one or more variant-tokens based at least on the search query and the contextual speller model;

generating one or more unique combinations of the n-grams and variant-tokens, wherein each unique combination comprises a variant-token corresponding to each misspelled n-gram;

calculating a relevance-score for each unique combination based at least in part on the search query and the contextual speller model, wherein the relevance-score for a unique combination is based on a comparison of a probability associated with the n-grams or variant tokens of the unique combination in the standard language model of the contextual speller model to a probability associated with the n-grams or variant tokens of the unique combination in the personal language model of the contextual speller model;

generating one or more corrected queries, each corrected query comprising a unique combination having a relevance-score greater than a threshold relevance-score; and sending, to the client system of the first user for display in response to receiving the search query, one or more of the corrected queries.

2. The method of claim 1, further comprising:
receiving from the first user a selection of one of the corrected queries;
identifying one or more objects matching the selected query; and
sending, to the client system of the first user, a search-result page responsive to the selected query, the search-results page comprising one or more references to one or more of the identified objects, respectively.

3. The method of claim 1, wherein identifying one or more variant-tokens for each misspelled n-gram comprises:
accessing, for each misspelled n-gram, the contextual speller model to identify the variant-tokens having probabilities of appearing in the search query greater than a threshold probability.

4. The method of claim 1, wherein calculating the relevance-score for each unique combination based at least in part on the search query and the contextual speller model comprises:
accessing, for each variant-token or n-gram of the unique combination, the contextual speller model to retrieve a probability of the variant-token or n-gram appearing in the search query; and
calculating the relevance-score for the unique combination based at least on one or more of the retrieved probabilities.

5. The method of claim 1, wherein calculating the relevance-score for each unique combination based at least in part on the search query and the contextual speller model comprises:
accessing, for each variant-token of the unique combination, the contextual speller model to determine a probability of the variant-token being correctly-spelled; and
calculating the relevance-score for the unique combination based at least on one or more of the determined probabilities corresponding to the variant-tokens of the unique combination.

6. The method of claim 1, wherein the standard language model comprises a plurality of n-grams corresponding to social-networking data of all users or entities of the online social network.

7. The method of claim 1, wherein the personal language model comprises a plurality of n-grams and associated metadata, the metadata associated with each n-gram comprising one or more of:
a frequency of use of the n-gram in the data forming a basis for the personal language model;
a time context associated with the n-gram; or
a social context associated with the n-gram.

8. The method of claim 1, wherein the personal language model comprises a plurality of n-grams extracted from one or more of:
one or more feed searches of the first user on the online social network;
one or more posts viewed by the first user on the online social network;
one or more posts viewed by a second user on the online social network, wherein the posts as viewed by the second user are associated with the first user of the online social network;
one or more likes of the first user on the online social network;
one or more previous search results of the first user on the online social network;
a profile of the first user on the online social network; or
any combination thereof.

9. The method of claim 1, wherein the personal language model is time-invariant.

10. The method of claim 1, wherein calculating the relevance-score for each unique combination based at least in part on the contextual speller model comprises modifying the calculated relevance-score of each unique combination comprising an n-gram having a frequency of use in the personal language model different from a frequency of use in the standard language model greater than a threshold frequency of use.

11. The method of claim 10, wherein modifying the calculated relevance-score of each unique combination comprising the n-gram having the frequency of use in the personal language model different from the frequency of use in the standard language model greater than the threshold frequency of use comprises:
increasing a probability of the n-gram appearing in the search query, the n-gram having the frequency of use in the personal language model different from the frequency of use in the standard language model greater than or equal to the threshold frequency of use; or
decreasing the probability of the n-gram appearing in the search query, the n-gram having the frequency of use in the personal language model different from the frequency of use in the standard language model less than the threshold frequency of use.

12. The method of claim 1, wherein the personal language model is further customized based on social-networking data associated with a first group of users.

13. The method of claim 1, wherein the social-networking data associated with the first user comprises data associated with the first user retrieved from the online social network within a pre-determined time range.

14. The method of claim 1, wherein the social-networking data associated with the first user comprises:
   demographic information of the first user; or
   one or more concepts of the online social network connected to the first user.

15. The method of claim 1, wherein the contextual speller model comprises a plurality of speller sub-models.

16. The method of claim 15, wherein one of the plurality of speller sub-models corresponds to social-networking data associated with a particular time context associated with the first user.

17. The method of claim 15, wherein one of the plurality of speller sub-models corresponds to social-networking data associated with a particular social context associated with the first user.

18. The method of claim 15, wherein the plurality of speller sub-models are based at least on one or more levels of aggregation, and wherein each level of aggregation differentiates the first user from global users of the online social network.

19. One or more computer-readable non-transitory storage media embodying software that is operable when executed to:
   receive, from a client system of a first user of an online social network, a search query comprising one or more n-grams;
   determine, based on a contextual speller model, that at least one n-gram of the one or more n-grams is misspelled, wherein the contextual speller model is based at least on a standard language model and a personal language model customized for the first user based on social-networking data associated with the first user;
   identify, for each misspelled n-gram, one or more variant-tokens based at least on the search query and the contextual speller model;
   generate one or more unique combinations of the n-grams and variant-tokens, wherein each unique combination comprises a variant-token corresponding to each misspelled n-gram;
   calculate a relevance-score for each unique combination based at least in part on the search query and the contextual speller model, wherein the relevance-score for a unique combination is based on a comparison of a probability associated with the n-grams or variant tokens of the unique combination in the standard language model of the contextual speller model to a probability associated with the n-grams or variant tokens of the unique combination in the personal language model of the contextual speller model;
   generate one or more corrected queries, each corrected query comprising a unique combination having a relevance-score greater than a threshold relevance-score; and
   send, to the client system of the first user for display in response to receiving the search query, one or more of the corrected queries.

20. A system comprising: one or more processors; and a memory coupled to the processors comprising instructions executable by the processors, the processors operable when executing the instructions to:
   receive, from a client system of a first user of an online social network, a search query comprising one or more n-grams;
   determine, based on a contextual speller model, that at least one n-gram of the one or more n-grams is misspelled, wherein the contextual speller model is based at least on a standard language model and a personal language model customized for the first user based on social-networking data associated with the first user;
   identify, for each misspelled n-gram, one or more variant-tokens based at least on the search query and the contextual speller model;
   generate one or more unique combinations of the n-grams and variant-tokens, wherein each unique combination comprises a variant-token corresponding to each misspelled n-gram;
   calculate a relevance-score for each unique combination based at least in part on the search query and the contextual speller model, wherein the relevance-score for a unique combination is based on a comparison of a probability associated with the n-grams or variant tokens of the unique combination in the standard language model of the contextual speller model to a probability associated with the n-grams or variant tokens of the unique combination in the personal language model of the contextual speller model;
   generate one or more corrected queries, each corrected query comprising a unique combination having a relevance-score greater than a threshold relevance-score; and
   send, to the client system of the first user for display in response to receiving the search query, one or more of the corrected queries.

21. The system of claim 20, wherein the processors are further operable when executing the instructions to:
   receive from the first user a selection of one of the corrected queries;
   identify one or more objects matching the selected query; and
   send, to the client system of the first user, a search-result page responsive to the selected query, the search-results page comprising one or more references to one or more of the identified objects, respectively.

22. The system of claim 20, wherein the instructions to identify one or more variant-tokens for each misspelled n-gram further comprise instructions to:
   access, for each misspelled n-gram, the contextual speller model to identify the variant-tokens having probabilities of appearing in the search query greater than a threshold probability.

23. The system of claim 20, wherein the instructions to calculate the relevance-score for each unique combination based at least in part on the search query and the contextual speller model further comprise instructions to:
   access, for each variant-token or n-gram of the unique combination, the contextual speller model to retrieve a probability of the variant-token or n-gram appearing in the search query; and
   calculate the relevance-score for the unique combination based at least on one or more of the retrieved probabilities.

24. The system of claim 20, wherein the instructions to calculate the relevance-score for each unique combination based at least in part on the search query and the contextual speller model further comprise instructions to:
   access, for each variant-token of the unique combination, the contextual speller model to determine a probability of the variant-token being correctly-spelled; and
   calculate the relevance-score for the unique combination based at least on one or more of the determined probabilities corresponding to the variant-tokens of the unique combination.

25. The system of claim 20, wherein the standard language model comprises a plurality of n-grams corresponding to social-networking data of all users or entities of the online social network.

26. The system of claim 20, wherein the personal language model comprises a plurality of n-grams and associated metadata, the metadata associated with each n-gram comprising one or more of:
- a frequency of use of the n-gram in the data forming a basis for the personal language model;
- a time context associated with the n-gram; or
- a social context associated with the n-gram.

27. The system of claim 20, wherein the personal language model comprises a plurality of n-grams extracted from one or more of:
- one or more feed searches of the first user on the online social network;
- one or more posts viewed by the first user on the online social network;
- one or more posts viewed by a second user on the online social network, wherein the posts as viewed by the second user are associated with the first user of the online social network;
- one or more likes of the first user on the online social network;
- one or more previous search results of the first user on the online social network;
- a profile of the first user on the online social network; or
- any combination thereof.

28. The system of claim 20, wherein the personal language model is time-invariant.

29. The system of claim 20, wherein the instructions to calculate the relevance-score for each unique combination based at least in part on the contextual speller model further comprise instructions to:
- modify the calculated relevance-score of each unique combination comprising an n-gram having a frequency of use in the personal language model different from a frequency of use in the standard language model greater than a threshold frequency of use.

30. The system of claim 29, wherein the instructions to modify the calculated relevance-score of each unique combination comprising the n-gram having the frequency of use in the personal language model different from the frequency of use in the standard language model greater than the threshold frequency of use further comprise instructions to:
- increase a probability of the n-gram appearing in the search query, the n-gram having the frequency of use in the personal language model different from the frequency of use in the standard language model greater than or equal to the threshold frequency of use; or
- decrease the probability of the n-gram appearing in the search query, the n-gram having the frequency of use in the personal language model different from the frequency of use in the standard language model less than the threshold frequency of use.

31. The system of claim 20, wherein the personal language model is further customized based on social-networking data associated with a first group of users.

32. The system of claim 20, wherein the social-networking data associated with the first user comprises data associated with the first user retrieved from the online social network within a pre-determined time range.

33. The system of claim 20, wherein the social-networking data comprises:
- demographic information of the first user; or
- one or more concepts of the online social network connected to the first user.

34. The system of claim 20, wherein the contextual speller model comprises a plurality of speller sub-models.

35. The system of claim 34, wherein one of the plurality of speller sub-models corresponds to social-networking data associated with a particular time context associated with the first user.

36. The system of claim 34, wherein one of the plurality of speller sub-models corresponds to social-networking data associated with a particular social context associated with the first user.

37. The system of claim 34, wherein the plurality of speller sub-models are based at least on one or more levels of aggregation, and wherein each level of aggregation differentiates the first user from global users of the online social network.

* * * * *